US011881910B2

(12) United States Patent
Kumaki et al.

(10) Patent No.: US 11,881,910 B2
(45) Date of Patent: *Jan. 23, 2024

(54) FILE TRANSMISSION/RECEPTION DEVICE AND CONTROL METHOD OF FILE TRANSMISSION/RECEPTION DEVICE

(71) Applicant: Kioxia Corporation, Tokyo (JP)

(72) Inventors: Yoshinari Kumaki, Yokohama (JP); Hidetomo Matsuo, Tokyo (JP); Kazuya Nara, Kawasaki (JP)

(73) Assignee: Kioxia Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/690,420

(22) Filed: Mar. 9, 2022

(65) Prior Publication Data

US 2022/0200660 A1 Jun. 23, 2022

Related U.S. Application Data

(63) Continuation of application No. 16/808,928, filed on Mar. 4, 2020, now Pat. No. 11,309,938, which is a (Continued)

(30) Foreign Application Priority Data

Mar. 13, 2014 (JP) .................. 2014-050845

(51) Int. Cl.
*H04B 5/00* (2006.01)
*H04W 76/23* (2018.01)
(Continued)

(52) U.S. Cl.
CPC ........... *H04B 5/0031* (2013.01); *H04L 67/06* (2013.01); *H04M 1/72412* (2021.01);
(Continued)

(58) Field of Classification Search
CPC .... H04B 5/0031; H04L 67/06; H04M 1/7253; H04M 2250/64; H04W 76/043; H04W 84/20
See application file for complete search history.

(56) References Cited

U.S. PATENT DOCUMENTS 8,898,242 B2    11/2014 Hiroki
2002/0115478 A1*  8/2002 Fujisawa ............... H04M 1/724
                                                    455/567

(Continued)

FOREIGN PATENT DOCUMENTS

JP    4405569 B1    11/2009
JP    2010-109608 A  5/2010
(Continued)

OTHER PUBLICATIONS

Taiwanese Office Action dated Mar. 14, 2016 in Taiwanese Application No. 104108257 (with English Translation).
(Continued)

*Primary Examiner* — Fayyaz Alam
(74) *Attorney, Agent, or Firm* — Oblon, McClelland, Maier & Neustadt, L.L.P.

(57) ABSTRACT

According to one embodiment, a file transmission/reception device includes a communication direction managing unit and an application unit. The communication direction managing unit, in near field communication, cuts off a connection with an opposing device in a case where a conflict occurs with the opposing device, and, after being reconnected to the opposing device, switches the file transmission/reception device to any one mode of a master mode and a slave mode. The application unit performs transmission, reception, or transmission/reception of a file between the opposing device and the file transmission/reception device in the master mode or the slave mode in accordance with a mode specified by the communication direction managing unit.

13 Claims, 33 Drawing Sheets

Related U.S. Application Data continuation of application No. 16/448,560, filed on Jun. 21, 2019, now Pat. No. 10,623,059, which is a continuation of application No. 16/202,446, filed on Nov. 28, 2018, now Pat. No. 10,454,531, which is a continuation of application No. 15/830,082, filed on Dec. 4, 2017, now Pat. No. 10,187,118, which is a continuation of application No. 15/123,999, filed as application No. PCT/JP2015/058393 on Mar. 13, 2015, now Pat. No. 9,859,954.

(51) Int. Cl.
*H04M 1/72412* (2021.01)
*H04L 67/06* (2022.01)
*H04W 84/20* (2009.01)

(52) U.S. Cl.
CPC .......... *H04W 76/23* (2018.02); *H04B 5/0025* (2013.01); *H04M 2250/64* (2013.01); *H04W 84/20* (2013.01)

(56) References Cited

U.S. PATENT DOCUMENTS

| | | |
|---|---|---|
| 2003/0109273 A1 | 6/2003 | Ono et al. |
| 2005/0262216 A1 | 11/2005 | Kashiwabara et al. |
| 2007/0287542 A1 | 12/2007 | Miyazaki et al. |
| 2010/0022187 A1 | 1/2010 | Ohkita |
| 2010/0325234 A1 | 12/2010 | Hiroki |
| 2010/0325237 A1* | 12/2010 | Hiroki ............... H04W 72/1257 709/217 |
| 2011/0022755 A1* | 1/2011 | Sueyoshi ............. H04B 5/0031 710/109 |
| 2011/0074552 A1* | 3/2011 | Norair ................. G06K 7/0008 340/10.1 |
| 2011/0230138 A1 | 9/2011 | Ohkita |
| 2012/0114052 A1* | 5/2012 | Haartsen ............. H04B 5/0025 375/259 |
| 2013/0065529 A1 | 3/2013 | Watanabe |
| 2013/0252557 A1 | 9/2013 | Hillyard et al. |
| 2014/0113553 A1 | 4/2014 | Brukalo |
| 2014/0204753 A1* | 7/2014 | Akita .................. H04W 72/048 370/235 |

FOREIGN PATENT DOCUMENTS

| | | |
|---|---|---|
| JP | 2010-258595 A | 11/2010 |
| JP | 2011-9872 A | 1/2011 |
| JP | 2011-91762 A | 5/2011 |
| JP | 2011-160164 A | 8/2011 |
| JP | 2012-231429 A | 11/2012 |
| JP | 2013-62742 A | 4/2013 |

OTHER PUBLICATIONS

International Search Report and Written Opinion dated Jun. 3, 2015 in PCT/JP15/058393 Filed Mar. 13, 2015.

* cited by examiner

FIG.17

```
CURRENT STATE
  Master: NO COMMUNICATION DATA
  Slave: COMMUNICATION COMPLETED BIDIRECTIONAL COMMUNICATION
      HAS BEEN COMPLETED
[SINCE THERE IS NO DATA SATISFYING
TRANSMISSION CONDITION, Master HAS NOT
   PERFORMED DATA COMMUNICATION]
```

FIG.24

| TRANSMISSION/ RECEPTION | PARTNER DEVICE ID | FILE NAME | UPDATE DATE AND TIME | SIZE | PACKET | STATUS |
|---|---|---|---|---|---|---|
| TRANSMISSION | B | a' | 20130101 | 50kB | 0 | TRANSMISSION COMPLETED |
| | | b' | 20130101 | 20kB | 0 | TRANSMISSION COMPLETED |
| | | c' | 20130301 | 10kB | 0 | NO TRANSMISSION |
| | | d' | 20131211 | 100kB | 0 | TRANSMISSION PROHIBITED |
| | | e' | 20140110 | 200kB | 0 | TRANSMISSION COMPLETED |
| | C | a' | 20130101 | 50kB | 0 | TRANSMISSION PROHIBITED |
| | | b' | 20130101 | 20kB | 0 | TRANSMISSION COMPLETED |
| | | c' | 20130301 | 10kB | 0 | NO TRANSMISSION |
| | | d' | 20131211 | 100kB | 0 | NO TRANSMISSION |
| | | e' | 20140110 | 200kB | 0 | NO TRANSMISSION |
| | D | a' | 20130101 | 50kB | 0 | TRANSMISSION COMPLETED |
| | | b' | 20130101 | 20kB | 0 | TRANSMISSION COMPLETED |
| | | c' | 20130301 | 10kB | 0 | TRANSMISSION COMPLETED |
| | | d' | 20131211 | 100kB | 0 | TRANSMISSION COMPLETED |
| | | e' | 20140110 | 200kB | 0 | NO TRANSMISSION |
| RECEPTION | B | a | 20140101 | 50kB | 0 | RECEPTION COMPLETED |
| | | b | 20120102 | 20kB | 0 | RECEPTION COMPLETED |
| | | c | 20140201 | 10kB | 0 | RECEPTION PROHIBITED |
| | D | a' | 20090901 | 50kB | 0 | RECEPTION COMPLETED |
| | | b' | 20101001 | 20kB | 0 | NO RECEPTION |
| | | c' | 20101211 | 10kB | 0 | NO RECEPTION |
| | | d' | 20110405 | 10kB | 0 | RECEPTION COMPLETED |

FIG.25

| TRANSMISSION/ RECEPTION | PARTNER DEVICE ID | FILE NAME | UPDATE DATE AND TIME | SIZE | PACKET | STATUS |
|---|---|---|---|---|---|---|
| TRANSMISSION | A | a | 20140101 | 30kB | 0 | TRANSMISSION COMPLETED |
| | | b | 20140102 | 100kB | 0 | TRANSMISSION COMPLETED |
| | | c | 20140201 | 500kB | 0 | TRANSMISSION PROHIBITED |
| RECEPTION | A | a' | 20130101 | 50kB | 0 | RECEPTION COMPLETED |
| | | b' | 20130101 | 20kB | 0 | RECEPTION COMPLETED |
| | | c' | 20130301 | 10kB | 0 | NO RECEPTION |
| | | d' | 20131211 | 100kB | 0 | RECEPTION PROHIBITED |
| | | e' | 20140110 | 200kB | 0 | RECEPTION COMPLETED |

| TRANSMISSION/ RECEPTION | PARTNER DEVICE ID | FILE NAME | UPDATE DATE AND TIME | SIZE | PACKET | STATUS |
|---|---|---|---|---|---|---|
| TRANSMISSION | 1 | Aaaa.jpg | 20140101 | 30kB | 30 | IN MIDDLE OF TRANSMISSION |
| | 600 | Bbbb.jpg | 20140102 | 100kB | 0 | TRANSMISSION COMPLETED |
| | 1000 | Cccccc.jpg | 20140201 | 500kB | 25 | IN MIDDLE OF TRANSMISSION |
| RECEPTION | 55 | Hhhhh.jpg | 20130101 | 50kB | 0 | RECEPTION COMPLETED |
| | 2345 | Kkkkk.jpg | 20101010 | 305kB | 55 | IN MIDDLE OF RECEPTION |

FIG. 39

| PARAMETER | Address | size [byte] | Bit Allocation ||||||||
|---|---|---|---|---|---|---|---|---|---|---|
| | | | Bit7 | Bit6 | Bit5 | Bit4 | Bit3 | Bit2 | Bit1 | Bit0 |
| Transfer Status | 0x01200 | 1 | RFC | | | | | | Device Mode | |
| File List Transfer Status (Interrupt) | | 1 | | | | | | | FLU | ILU |
| Reserved (Interrupt) | | 1 | | | | | | | | |
| Reserved for Vender (Interrupt) | | 1 | | | | | | | | |
| Reserved | | 4 | | | | | | | | |
| Application | | 1 | | | | | Application ||||
| Transfer Jet Communication Status | | 1 | Connected | | | | Service | Authentication | TxRx | Communication Statue |
| | | 1 | Authentication Type | Authentication Request | | | | | | Action Send Status |
| | | 1 | | | | | SD over SCSI Target | SCSI Target | OBEX FTP Server | OBEX PUSH Server |
| | | 1 | Service Select Type | Service Select Request | | | SD over SCSI Initiator | SCSI Initiator | OBEX FTP Client | OBEX PUSH Client |
| Reserved | | 3 | | | | | | | | |
| OwnUID | | 8 | OwnUID ||||||||
| TargetUID | | 8 | TargetUID ||||||||
| Security Mode | | 1 | Security Mode ||||||||
| Signal Strength | | 1 | Signal Strength ||||||||
| Reserved | | 2 | | | | | | | | |
| File Size | | 4 | File Size ||||||||
| File Transfer Progress | | 4 | Transferred File Size ||||||||
| Power Save Management | | 1 | | | | | | | | PSM |
| File System Management | | 1 | | | | | | | | FM |
| Reserved | | 2 | | | | | | | | |

FILE TRANSMISSION/RECEPTION DEVICE AND CONTROL METHOD OF FILE TRANSMISSION/RECEPTION DEVICE

CROSS-REFERENCE TO RELATED APPLICATIONS

This application is a continuation of U.S. application Ser. No. 16/808,928 filed Mar. 4, 2020, which is a continuation of U.S. application Ser. No. 16/448,560 filed Jun. 21, 2019, which is a continuation of U.S. application Ser. No. 16/202,446 filed Nov. 28, 2018, which is a continuation of U.S. application Ser. No. 15/830,082 filed Dec. 4, 2017, which is a continuation of U.S. application Ser. No. 15/123,999, filed Sep. 6, 2016, which the national stage of PCT/JP2015/058393, filed Mar. 13, 2015, which is based upon and claims the benefit of priority from Japanese Patent Application No. 2014-050845, filed on Mar. 13, 2014; the entire contents of each of which are incorporated herein by reference.

FIELD

Embodiments described herein relate generally to a file transmission/reception device and a control method of file transmission/reception device.

BACKGROUND

Conventionally, in a case where data transmission is performed through near field communication, generally, a processing request is issued from a master device to a slave device. In TransferJet (trademark) that is one of near field communication technologies, priority levels of devices are determined based on modes at the time of waiting for a connection. When a device waiting as a master is connected to a device waiting as a slave, a connection can be established between the master device having a high priority level and the slave device having a low priority level. In addition, a device having a dynamic mode at the time of connection waiting determines a priority level of the device in accordance with a partner device such that the device has a low priority level in a case where the partner device is a master, and the device has a high priority level in a case where the partner device is a slave.

However, in the conventional technology, in a case where master devices each having a file transmission request or dynamic devices approach each other, a determination of which one is a high-priority device cannot be made, a connection cannot be established, and a conflict occurs. Accordingly, a communication function using an OBEX (Object Exchange) protocol or the like cannot be operated between devices having the same mode.

CITATION LIST

Patent Literature

[PTL 1] Japanese Patent Application Laid-open No. 2011-91762

BRIEF DESCRIPTION OF THE DRAWINGS

FIG. 17 is a diagram that illustrates an example of a display after completion of bidirectional communication in a communication device;

FIG. 24 is a diagram that illustrates an example of the configuration of a transmission history list of a transmission history storing unit of the device A;

FIG. 25 is a diagram that illustrates an example of the configuration of a transmission history list of a transmission history storing unit of a device B;

FIG. 39 is a diagram that illustrates an example of the configuration of a register map.

DETAILED DESCRIPTION

In general, according to one embodiment, a file transmission/reception device includes a communication direction managing unit and an application unit. The communication direction managing unit, in near field communication, cuts off a connection with an opposing device in a case where a conflict occurs with the opposing device, and, after being reconnected to the opposing device, switches the file transmission/reception device to any one mode of a master mode and a slave mode. The application unit performs transmission, reception, or transmission/reception of a file between the opposing device and the file transmission/reception device in the master mode or the slave mode in accordance with a mode specified by the communication direction managing unit.

Exemplary embodiments of a file transmission/reception device and a file transmission/reception method will be described below in detail with reference to the accompanying drawings. The present invention is not limited to the following embodiments.

First Embodiment

Figure 1:
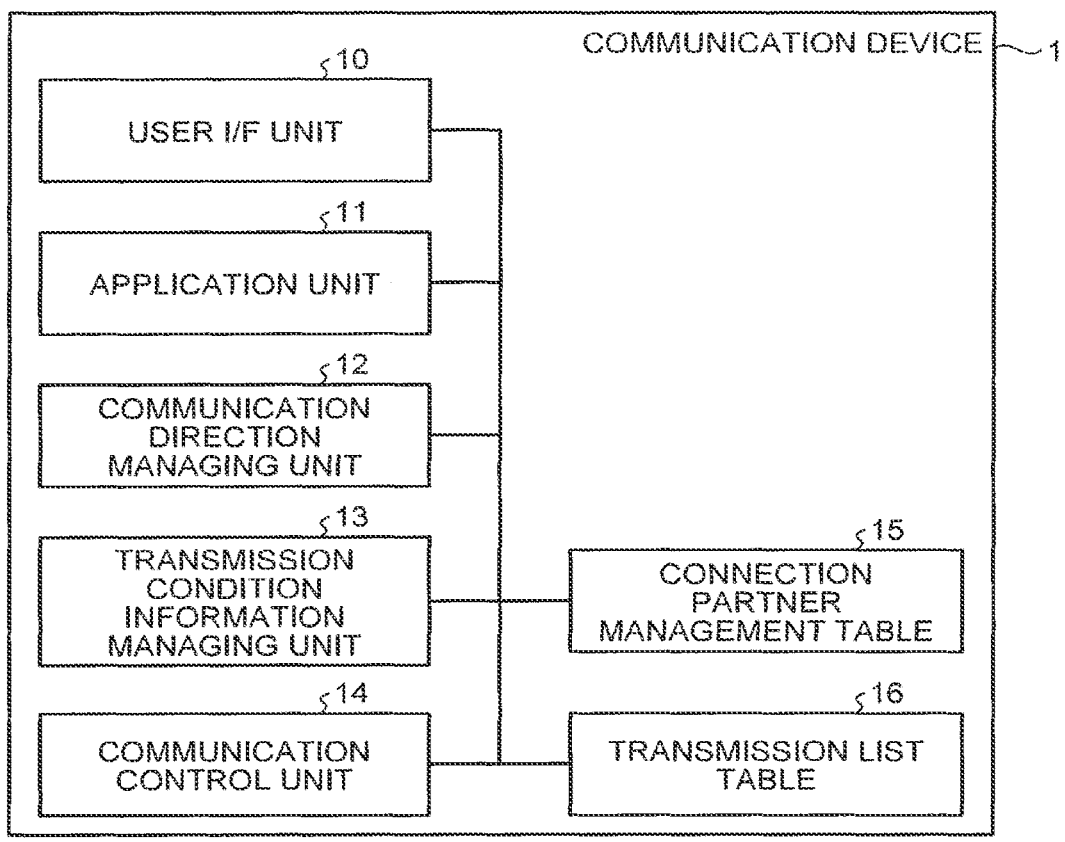
FIG. 1 is a diagram that illustrates an example of the configuration of a communication device according to a first embodiment.

FIG. 1 is a diagram that illustrates an example of the configuration of a communication device 1 according to this embodiment. The communication device 1 that is a file transmission/reception device includes: a user I/F unit 10; an application unit 11; a communication direction managing unit 12; a transmission condition information managing unit 13; a communication control unit 14; a connection partner management table 15; and a transmission list table 16.

The user I/F unit 10 serves as an interface with user's processes such as start of communication, registration of a user name, an input of the connection partner management table 15, and category classification of transmission data.

The application unit 11 executes a master process and a slave process and performs management and the like of the overall operations such as file transmission and file reception.

The communication direction managing unit 12, in a case where a device to which it belongs and an opposing device have the same mode so as to cause a conflict, performs a comparison of unique IDs (UIDs), generation of a random number, and the like and determines a mode (the master or the slave) of the device to which it belongs. After the completion of unidirectional communication (one mode) is completed, the communication direction managing unit 12 switches the mode of the device to which it belongs from the master to the slave or from the slave to the master.

The transmission condition information managing unit 13 acquires and manages transmission condition information of the opposing device after establishment of a connection and determines a target file to be transmitted or received.

The communication control unit 14 performs transmission/reception of a data frame such as a connection request, a connection response, or a cut-off request.

The connection partner management table 15 is a table used for registering information of an opposing device, which is a connection partner, input by a user.

The transmission list table 16 is a table used for registering a file to be transmitted at the time of being connected to the opposing device and a category to which the file belongs.

Figure 2:
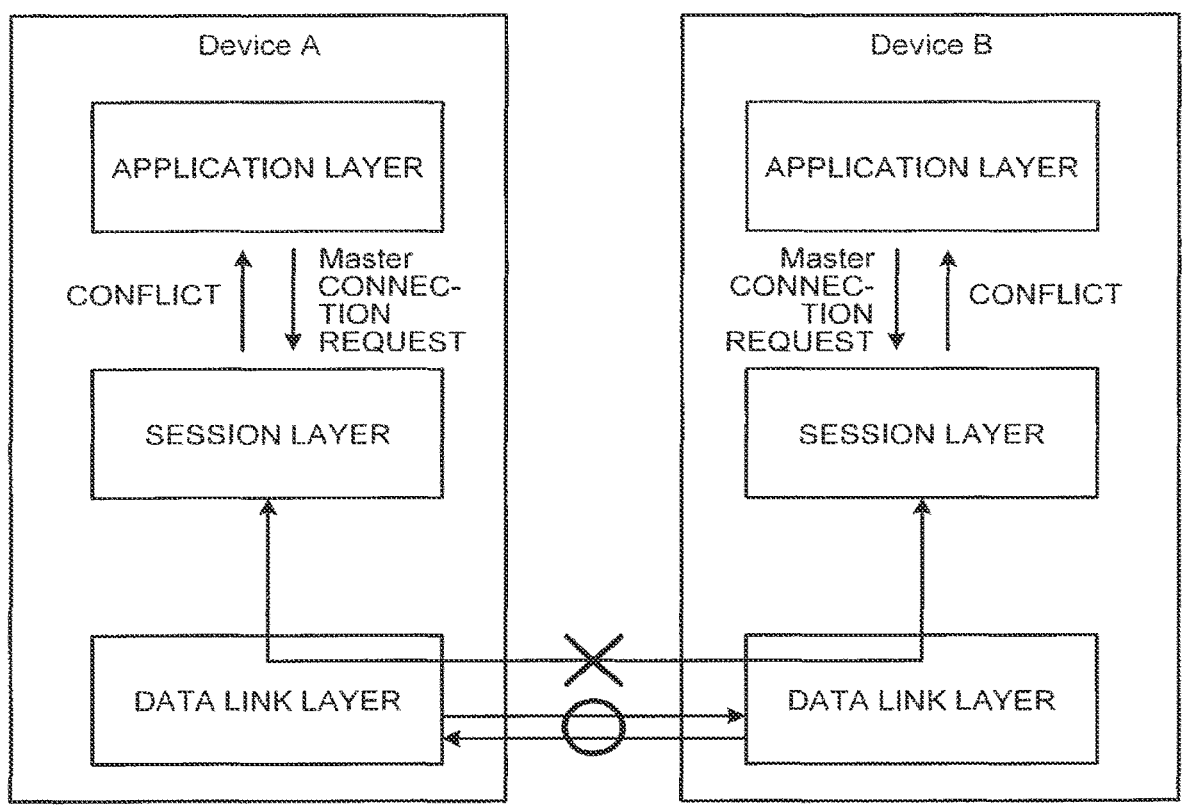
FIG. 2 is a diagram that illustrates a hierarchical model of TransferJet.

In this embodiment, as an example of a case where data communication is performed using near field communication, a case will be described in which the communication device 1 transmits/receives a file to/from an opposing device using TransferJet (trademark). While, in TransferJet, there are modes of master, dynamic, and slave, in description presented hereinafter, the master and the slave will be used, and it is assumed that the master has high priority, and the slave has low priority. Here, a hierarchical model of TransferJet will be described in a simple manner. FIG. 2 is a diagram that illustrates the hierarchical model of TransferJet. It illustrates the appearance of an occurrence of a conflict when devices A and B, which are communication devices 1, are connected. When largely divided, the hierarchical model of TransferJet can be divided into three layers of an application layer, a session layer, and a data link layer.

When a connection as a master is requested from the application layer, a connection request data frame is transmitted in the data link layer. In the data link layer, in a case where the mode of the corresponding device is either the master or the slave, a data frame transmitted from a partner device can be received. However, when devices of the master having the same priority level mutually receive connection request data frames, a conflict is recognized in the session layer, and accordingly, a connection cannot be correctly made. In this way, in the application layer, in a case where a device requests a connection as a master and approaches the other master, a conflict notification is received, and protocol communication cannot be performed. In addition, in the session layer, in a case where masters mutually receive connection requests, a conflict state is formed, and accordingly, a connection cannot be correctly established. In addition, in the data link layer, even when the upper layer is in the conflict state, devices can transmit and receive data frames thereof.

Subsequently, in the communication device 1, in a case where a conflict occurs at the time of connecting with the communication device 1 that is an opposing device, an operation of bidirectional communication for resolving the conflict and performing file transmission/reception will be described. A device A (UID: 0x22222222) and a device B (UID: 0x111111) that are communication devices 1 are assumed to be in the master mode (or the dynamic mode) together so as to be in a connection waiting state as an initial state, and both devices are assumed to be in the state of transmitting a connection request data frame.

Figure 3:
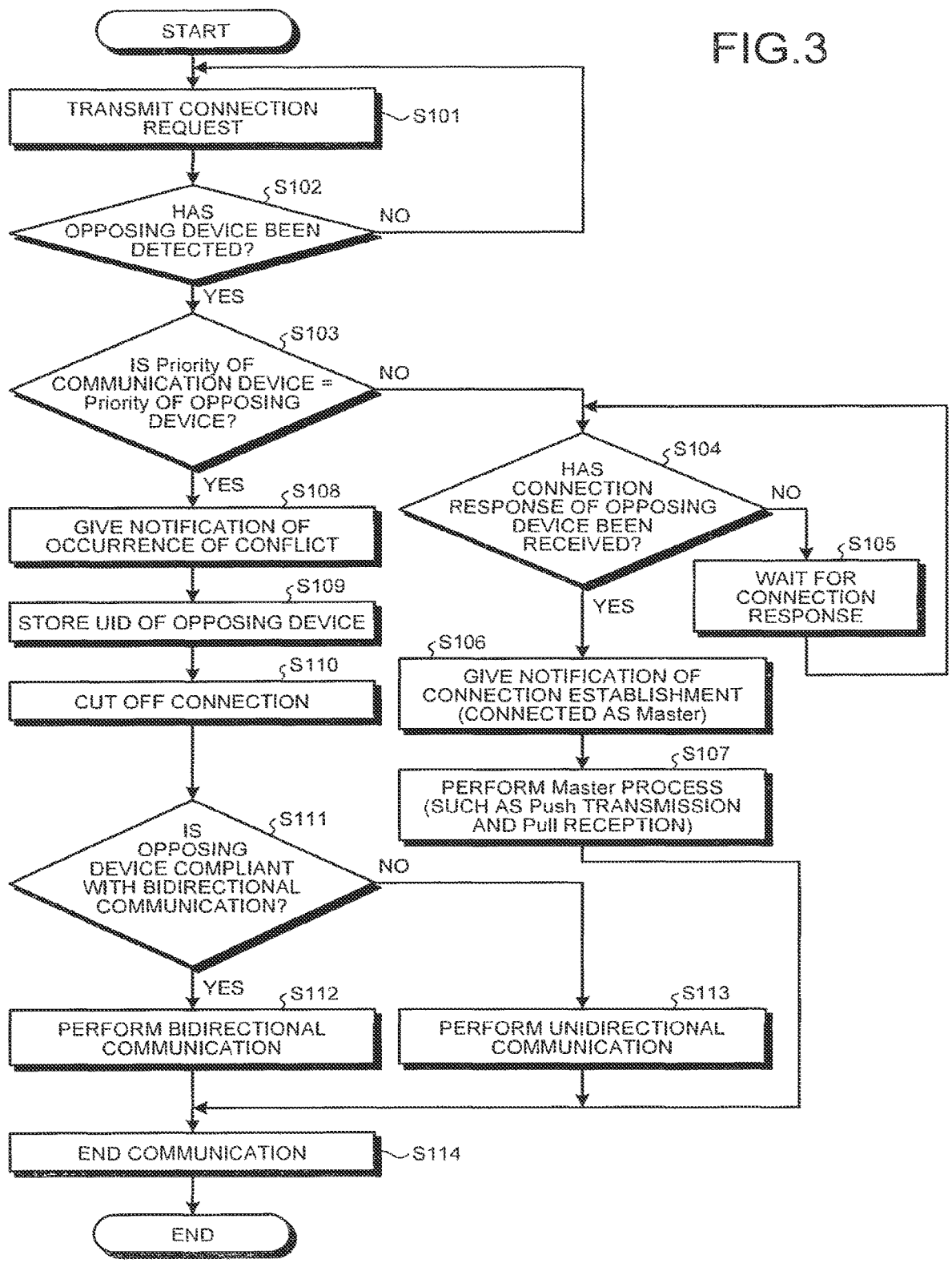
FIG. 3 is a flowchart that illustrates a file transmission/reception process according to the first embodiment.

FIG. 3 is a flowchart that illustrates a file transmission/reception process according to this embodiment. By switching the modes of devices in the following sequence represented in the flowchart, the devices sequentially become a master and a slave and can transmit desired files. Here, the opposing device of the device A is the device B, and the opposing device of the device B is the device A.

First, in each of the devices A and B, when a user starts communication, the application unit 11 starts a connection by setting the mode of the device to which it belongs as a master, and the communication control unit 14 starts to transmit a connection request data frame (Step S101). The communication control unit 14 continuously transmits a connection request data frame on a regular basis (Step S101) while a connection request data frame transmitted by an opposing device is not received, in other words, while the opposing device is not detected (No in Step S102).

Next, the devices A and B approach each other. In each of the devices A and B, when a connection request data frame transmitted by an opposing device is received, in other words, when an opposing device is detected (Yes in Step S102), the communication control unit 14 analyzes the content of the received connection request data frame. Since a priority level of the device that is the request issuance source is written in the connection request data frame, the communication control unit 14 compares the priority level with a priority level of the device to which it belongs (Step S103).

In a case where the priority level of the above-described device and the priority level of the opposing device are different from each other, in other words, in a case where one device is a master, and the other device is a slave, a case where one device is a master, and the other device is a dynamic, or the like (No in Step S103), a device having a lower priority level establishes a connection by returning a connection response data frame. For example, in a case where the device A is a master, and the device B is a slave, a connection response data frame is returned from the device B to the device A. In a case where a connection response data frame has not been received from the device B (No in Step S104), the device A waits for a connection response data frame (Step S105), and the process is returned to Step S104. When the connection response data frame is received from the device B (Yes in Step S104), the device A is connected as a master and gives a notification of a connection establishment (Step S106), performs a master process such as a push transmission process or a pull reception process (Step S107), and ends the communication with the opposing device (Step S114). The process from Step S103: No to Step S107 is a general process similar to a conventional case, and thus, detailed description thereof will not be presented.

In a case where the priority level of the above-described device and the priority level of the opposing device are the same (in a case where both devices are masters or dynamics) (Yes in Step S103), in each of the devices A and B, the communication control unit 14 gives a notification of an occurrence of a conflict (Step S108).

Figure 4:
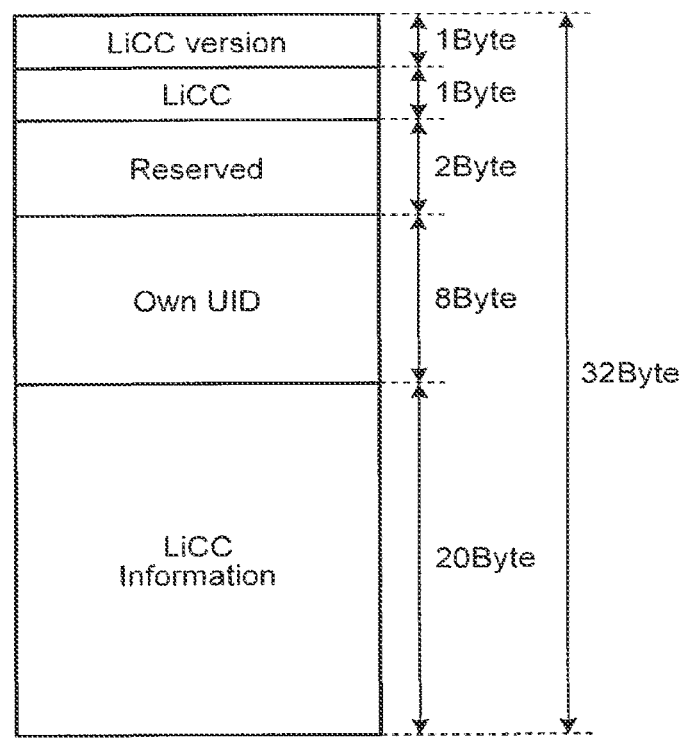
FIG. 4 is a diagram that illustrates an example of the configuration of a data frame of TransferJet.

In each of the devices A and B, when the conflict occurrence notification is received, the communication direction managing unit 12 reads UID information from a connection request data frame of the opposing device and stores the read UID information (Step S109). FIG. 4 is a diagram that illustrates an example of the configuration of a data frame of TransferJet. A data frame that is transmitted and received in the data link layer of TransferJet is configured by: an LiCC version that represents version information (specification information) from which it can be checked whether or not a bidirectional communication operation according to this embodiment is supported; an LiCC that represents the data frame type; "Reserved" that represents reserved information; an Own UID that represents a UID of a transmission source device; and an LiCC information that is information of a data frame. In a case where each of the devices A and B is connected to the opposing device in the data link layer, UID information and version information can be acquired from the opposing device. The device A acquires a UID "0x11111111" from the device B that is an opposing device, and the device B acquires a UID "0x22222222" from the device A that is an opposing device.

In each of the devices A and B, the communication direction managing unit 12 transmits a cut-off request data frame, thereby cutting off a connection with the opposing device once (Step S110).

In each of the devices A and B, the communication direction managing unit 12 checks the version information of the connection request data frame received from the opposing device after the cutting off of the connection and checks whether or not the opposing device is compliant with the bidirectional communication operation according to this embodiment as well (Step S111).

In each of the devices A and B, in a case where the opposing device is compliant with the bidirectional communication operation according to this embodiment (Yes in Step S111), a bidirectional communication process is performed (Step S112), and the communication with the opposing device ends (Step S114). On the other hand, in each of the devices A and B, in a case where the opposing device is not compliant with the bidirectional communication operation according to this embodiment (No in Step S111), a unidirectional communication process is performed (Step S113), and the communication with the opposing device ends (Step S114).

Figure 5:
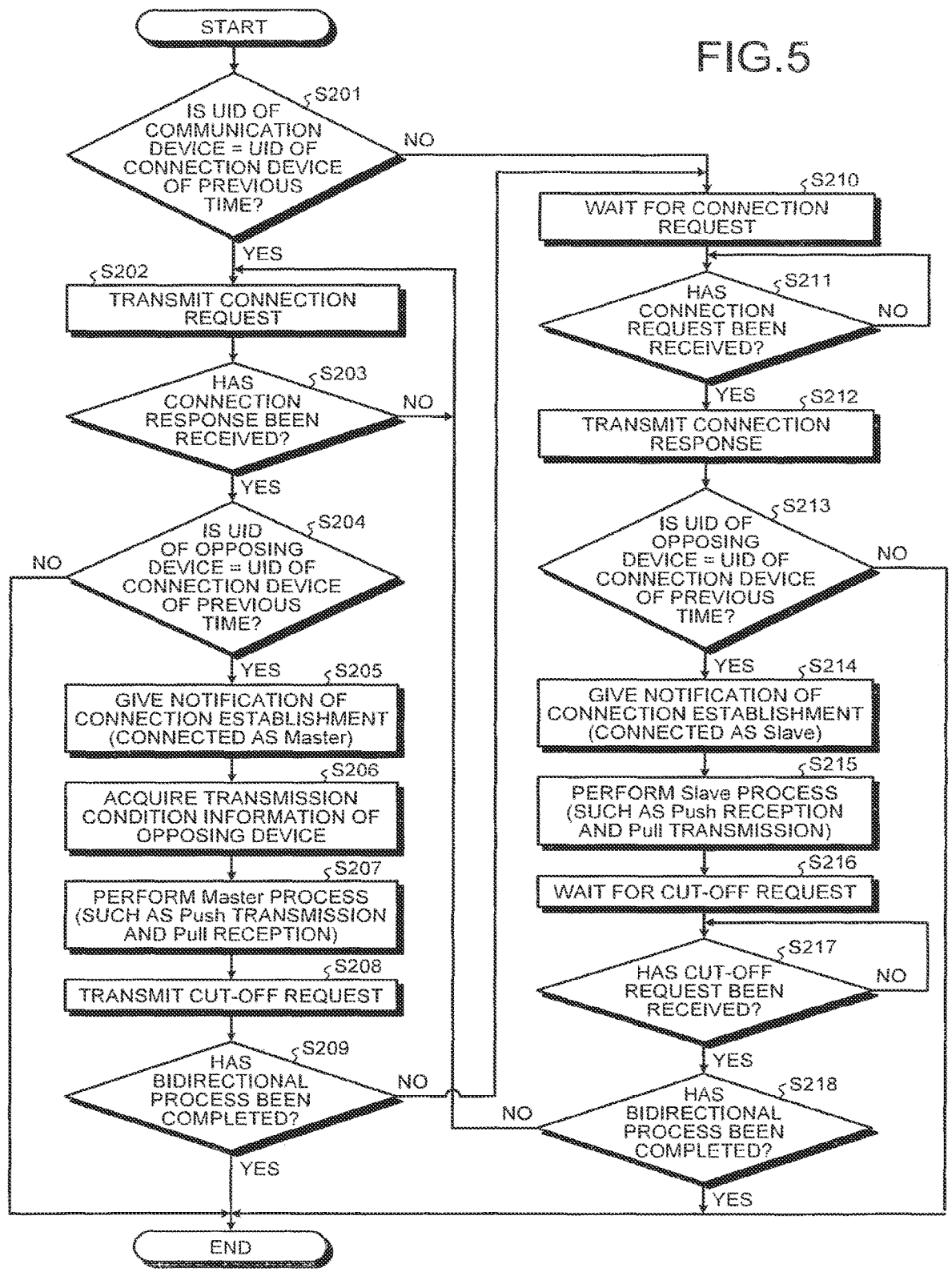
FIG. 5 is a flowchart that illustrates a bidirectional communication process according to the first embodiment.

In this embodiment, an operation of the bidirectional communication (Step S112) will be described. FIG. 5 is a flowchart that illustrates the bidirectional communication process according to this embodiment. Here, the description will be focused on the device A.

In each of the devices A and B, the communication direction managing unit 12 compares the UID of the device to which it belongs and the UID of the opposing device at the time of the previous connection, and a device having a larger UID first becomes a master, and a device having a smaller UID first becomes a slave (Step S201). In the device A, since the UID of the device A>the UID of the device B (Yes in Step S201), the communication direction managing unit 12 determines that the device to which it belongs becomes a master. On the other hand, in the device B, since the UID of the device A>the UID of the device B (No in Step S201), the communication direction managing unit 12 determines that the device to which it belongs becomes a slave.

In the device A, the communication control unit 14 transmits a connection request data frame (Step S202) and, in a case where a connection response data frame has not been received from the device B (No in Step S203), continuously transmits a connection request data frame on a regular basis until a connection response data frame is received (Step S202).

In the device A, when the communication control unit 14 receives a connection response data frame from the device B (Yes in Step S203), the communication control unit 14 compares the UID included in the connection response data frame with the UID of the opposing device at the time of the previous connection (Step S204). In a case where the UIDs do not match each other (No in Step S204), the communication control unit 14 ends bidirectional communication. On the other hand, in a case where the UIDs match each other (Yes in Step S204), the communication control unit 14 notifies the application unit 11 of the establishment of a connection (Step S205). The application unit 11 performs a connection as a master (Step S205).

In the device A, the transmission condition information managing unit 13 acquires transmission condition information from the device B of the slave side (Step S206) and determines a master process for the device B of the slave side based on the acquired information. More specifically, selection of a file to be transmitted and the like are performed, and details thereof will be described in an embodiment to be described later.

In the device A, the application unit 11 performs a master processes such as push transmission or pull reception in accordance with the master process determined by the transmission condition information managing unit 13 (Step S207).

When the master process is completed, in the device A, the communication direction managing unit 12 transmits a cut-off request data frame to the device B (opposing device) of the slave side together with a master process completion notification, thereby cutting off the connection with the opposing device once (Step S208).

The communication direction managing unit 12 checks whether or not a process of bidirectional communication of the master side and the slave side has been completed (Step S209). In a case where the process of bidirectional communication of the master side and the slave side has not been completed (No in Step S209), the communication direction managing unit 12 sets a slave as a mode that has not been completed yet, here, the mode of the application unit 11, and the communication control unit 14 is in a connection waiting state in the slave mode (Step S210). On the other hand, in a case where the process of bidirectional communication is completed (Yes in Step S209), the communication direction managing unit 12 ends the bidirectional communication.

In the device A, the communication control unit 14 waits until a connection request data frame is received from the device B (No in Step S211). When the connection request data frame is received (Yes in Step S211), the communication control unit 14 transmits a connection response data frame (Step S212).

In the device A, the communication control unit 14 compares a UID included in the connection request data frame transmitted from the device B with the UID of the opposing device at the time of the previous connection (Step S213). In a case where the UIDs do not match each other (No in Step S213), the communication control unit 14 ends the bidirectional communication. On the other hand, in a case where the UIDs match each other (Yes in Step S213), the communication control unit 14 notifies the application unit 11 of the establishment of a connection (Step S214). The application unit 11 performs a connection as a slave (Step S214).

In the device A, the application unit 11 performs a process (a data reception process according to a push from the device B that is a master, a data transmission process according to pull, and the like) of the slave side (Step S215).

In the device A, when the slave process is completed, the communication control unit 14 waits for a cut-off request data frame transmitted from the device B (Step S216). The communication control unit 14 waits until the cut-off request data frame is received from the device B (No in Step S217) and cuts off the connection with the device B when the cut-off request data frame is received (Yes in Step S217).

The communication direction managing unit 12 checks whether or not the process of bidirectional communication of the master side and the slave side has been completed (Step S218). In a case where the process of bidirectional communication of the master side and the slave side has been completed (Yes in Step S218), the communication direction managing unit 12 ends the bidirectional communication. On the other hand, in a case where the process of the bidirectional communication of the master side and the slave side has not been completed (No in Step S218), the communication direction managing unit 12 sets a master as a mode that has not been completed, here, the mode of the application unit 11, and the communication control unit 14 transmits a connection request data frame as the master mode (Step S202).

In this way, the device A performs the process in order of Steps S201 to S218 and ends the process of the bidirectional communication. On the other hand, since Step S201: No is satisfied, the device B performs the process in order of Steps of S201, 3210 to S218, and S202 to S209 and ends the process of the bidirectional communication. In any of the devices, by making a connection to an opposing device by performing switching between the master and the slave, communication in each mode can be performed.

In the file transmission/reception process illustrated in FIG. 3 and the process of the bidirectional communication illustrated in FIG. 5, there are several processes of the devices A and B cutting off the connection once and making reconnection. However, a case may be considered in which the reconnection cannot be made due to detachment of the opposing device during the cutting-off of the connection, breakdown of the opposing device, or the like. Accordingly, in the devices A and B, in a case where a reconnection to the opposing device cannot be made for a predetermined period or more in the reconnection process, the bidirectional process ends in the middle of the process.

Figure 6:
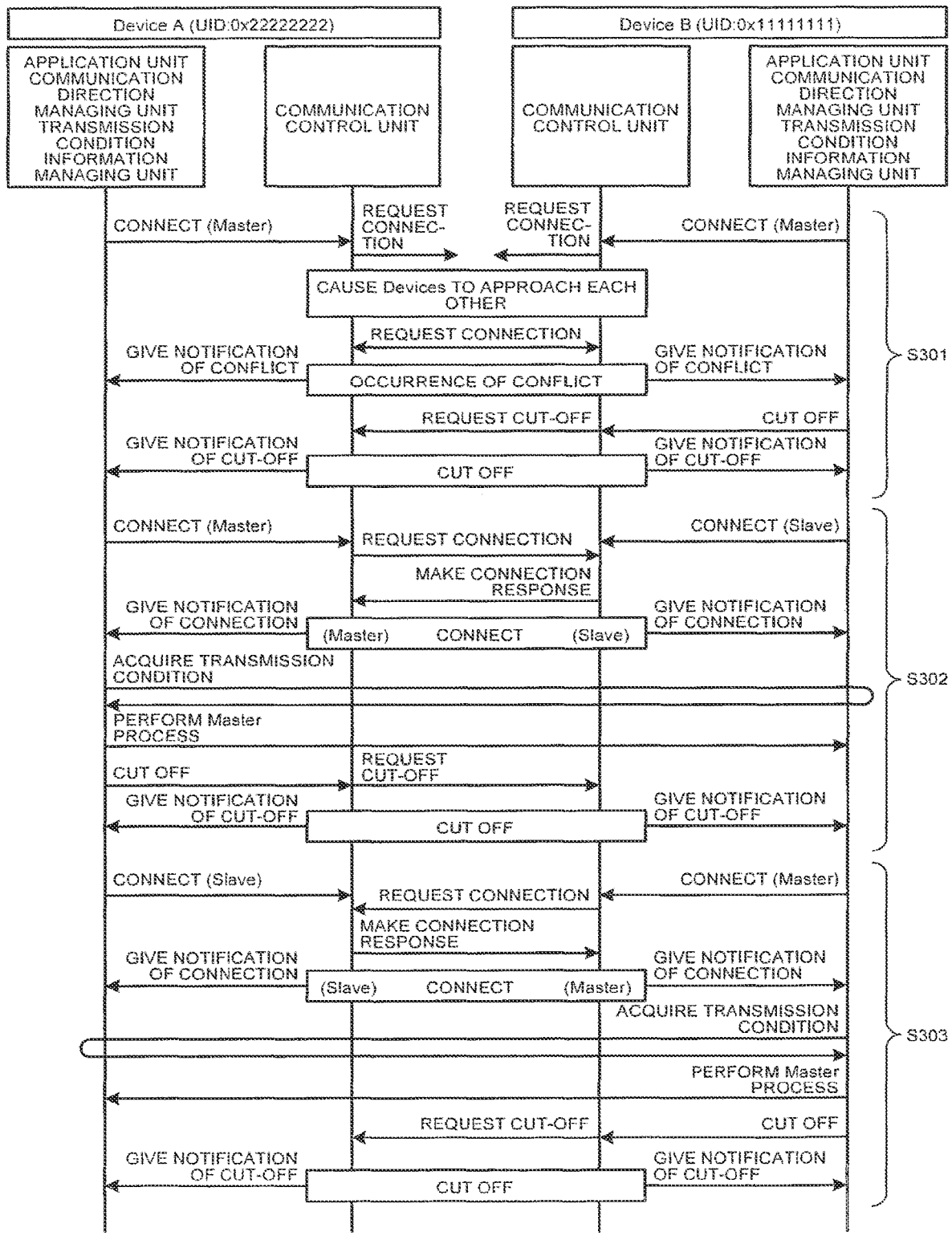
FIG. 6 is a sequence diagram that illustrates a file transmission/reception process between devices A and B.

The file transmission/reception process performed by the devices A and B will be described with reference to a sequence diagram. FIG. 6 is a sequence diagram that illustrates the file transmission/reception process between the devices A and B. Step S301 corresponds to the process of Steps S101 to S111 illustrated in FIG. 3. In addition, Step S302 corresponds to Steps S201 to S209 illustrated in FIG. 5 for the device A and corresponds to Steps S201 and Steps S210 to S218 illustrated in FIG. 5 for the device B. Furthermore, Step S303 corresponds to Steps S201 and S210 to S218 illustrated in FIG. 5 for the device A and corresponds to Steps S201 to S209 illustrated in FIG. 5 for the device B. In this way, the devices A and B performs a similar process of performing switching between the master and the slave after an occurrence of a conflict, whereby bidirectional communication can be performed.

Figure 7:
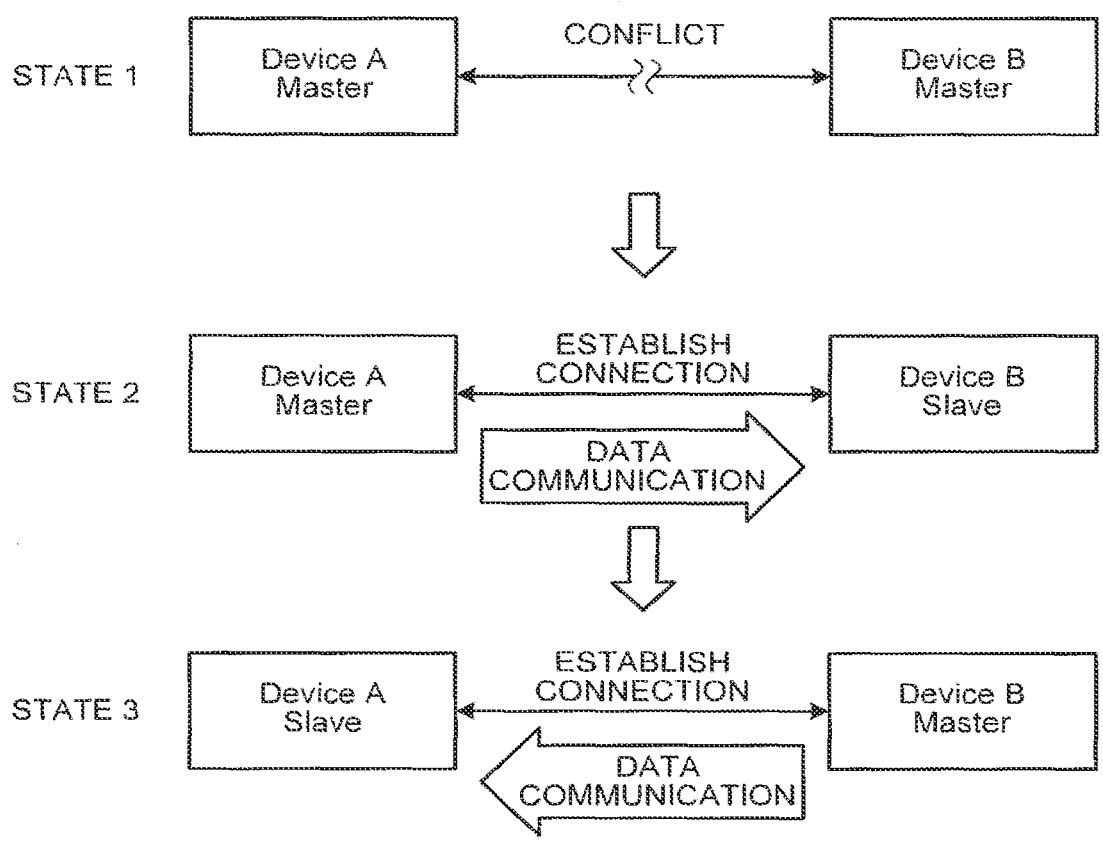
FIG. 7 is a diagram that illustrates mode transitions of each device.

FIG. 7 is a diagram that illustrates mode transitions of each device. In the sequence diagram illustrated in FIG. 6, each device state is extracted. First, as State 1, since devices A and B make connection requests as masters, a conflict occurs, and accordingly, communication cannot be performed. Next, as a result of a comparison between UIDs, first, as State 2, the device A operates as a master, and the device B operates as a slave. When the devices A and B approach each other in this state, a connection is established, and data communication is performed from the device A. When the data communication from the device A is completed, the mode is switched, and, as State 3, the device A operates as a slave, and the device B operates as a master.

When the devices A and B approach each other in this state, a connection is established, and data communication from the device B can be performed.

Figure 8:
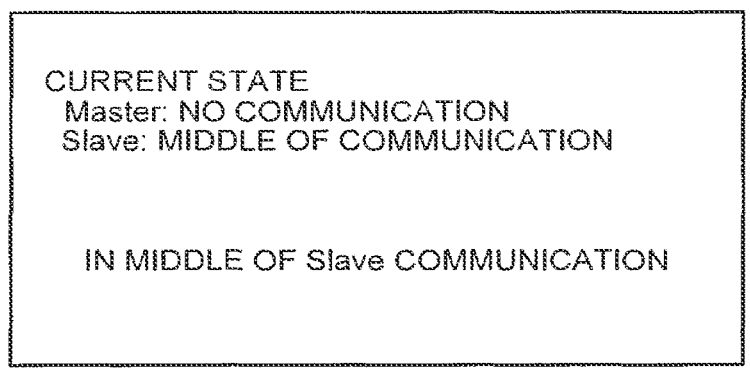
FIG. 8 is a diagram that illustrates an example of a display of a communication state in a communication device.
Figure 9:
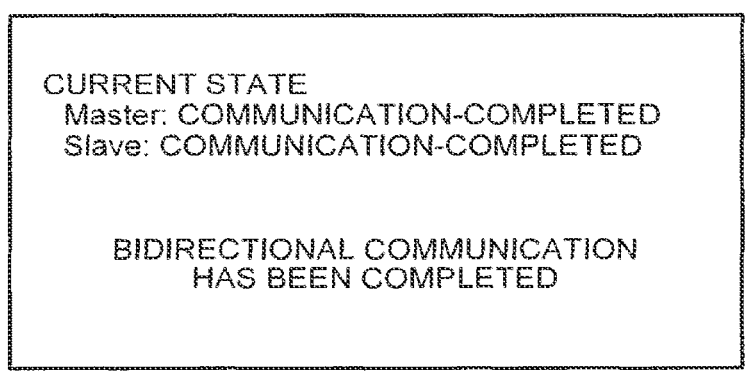
FIG. 9 is a diagram that illustrates an example of a display after completion of bidirectional communication in a communication device.

In addition, in the communication device 1, although not illustrated in FIG. 1, a current communication state and a communication result can be represented in a display unit included in the communication device to a user. FIG. 8 is a diagram that illustrates an example of a display of a communication state in the communication device 1. For example, in the communication device 1 that is in the middle of performing a bidirectional communication process, in the middle of performing a slave process for the first time, in a case where a master process is not performed yet, by displaying "No Communication" as the master, "Middle of Communication" as the slave, and "Currently in Middle of Slave Communication", a state of the device can be represented to the user. As a content to be displayed, in a case where one of the modes is completed, "Communication Completion" is represented. FIG. 9 is a diagram that illustrates an example of a display after completion of bidirectional communication in the communication device 1. In each device, in a case where the master process and the slave process are completed as the bidirectional communication process, by displaying "Communication Completion" as the master, "Communication Completion" as the slave, and "Completion of Bidirectional Communication", the state of the device can be represented to the user. As a content to be displayed, "Communication Failure" is displayed in a case where communication fails, and "No Communication Data" is displayed in a case where there is no communication data.

In this embodiment, in a case where two devices perform communication by being switched between the master and the slave through bidirectional communication, as described above, the communication with the opposing device is cut off once, and a process of switching between the modes and then making a reconnection is performed. As a method of switching two devices between the master and the slave, there is a method in which switching is checked by transmitting confirmation information of switching from the master to the slave, switching from the slave to the master, or the like between the two devices. However, by cutting off the communication once, each device can reliably recognize timing at which the mode of the opposing device is switched and can be restarted in a state in which the modes thereof are determined.

In addition, in this embodiment, in a case where a conflict occurs between a device and an opposing device, while the devices are configured to be automatically switched between the modes of the master and the slave, it may be configured such that an operation is received from a user operating the device, and bidirectional communication may be started at timing according to manual operation. In such a case, in accordance with a user operation, one device may be configured as a master, and the other device may be configured as a slave. In addition, also even when a conflict does not occur between the device and the opposing device, in a case where there is a file desired to be transmitted or received, a user may manually start bidirectional communication.

Furthermore, in this embodiment, while each device exchanges the information of UIDs with the opposing device and determines the mode of the master or the slave in accordance with the magnitude of the UIDs, the method of determining the mode is not limited thereto. While each device exchanges the information of UIDs with the opposing device through a data frame, by using "Reserved" of the data frame, the information may include information of setting/clearing a bit or the like, for example, for information relating to a file such as information representing a priority level of the file, a file size, presence/no-presence of a file to be transmitted or received, and requirement/no-requirement of transmission/reception of the file. Each device may determine the mode by using such information relating to a file.

In addition, in this embodiment, while a case has been described in which a file is transmitted and received using TransferJet as near field communication, the case is an example, and the technology is not limited to TransferJet.

According to the first embodiment, the communication device 1 that is a file transmission/reception device, in a case where a conflict occurs between the communication device and the opposing device due to the same mode, transmits and receives UIDs to/from the opposing device in a state in which communication of a data frame can be performed in the data link layer, and, based on a result of the comparison between the UID of the opposing device and the UID of the communication device, operates as a master or a slave that is different from the mode of the opposing device so as to perform the process in one mode. Thereafter, the communication device 1 together with the opposing device switches the mode and performs the process in the other mode, thereby performing transmission, reception, or transmission/reception of a file. As a result, an advantage of being capable of resolving a conflict and transmitting/receiving a file between the device and the opposing device even in a case where the conflict occurs between the communication device and the opposing device can be acquired.

Second Embodiment

In this embodiment, a process of bidirectional communication (Step S112 illustrated in FIG. 3) different from that of the first embodiment will be described. The configuration of a communication device 1 is similar to that of the first embodiment, and a file transmission/reception process (the flowchart illustrated in FIG. 3) other than the bidirectional communication process is similar to that of the first embodiment.

Figure 10:
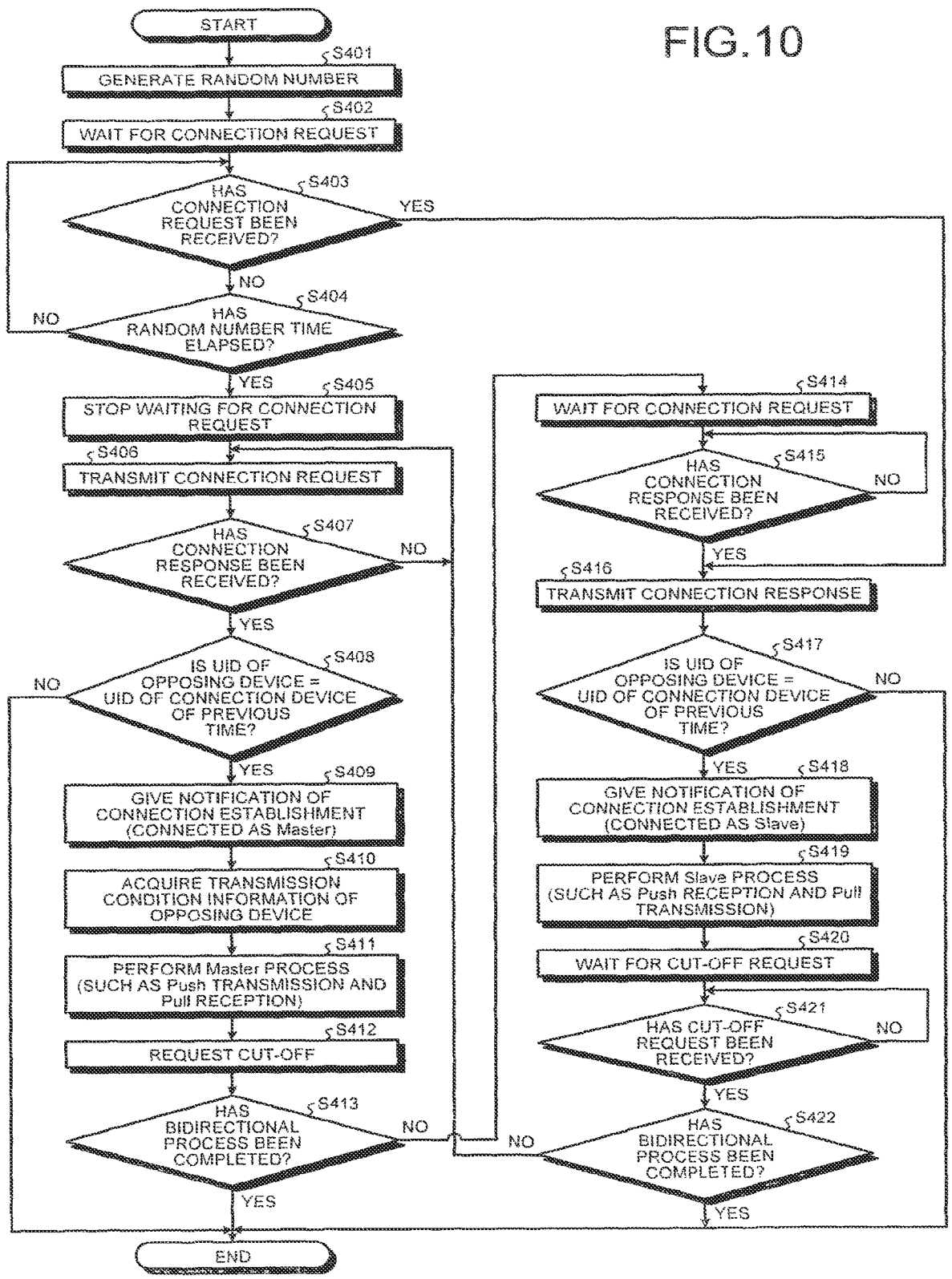
FIG. 10 is a flowchart that illustrates a bidirectional communication process according to a second embodiment.

FIG. 10 is a flowchart that illustrates the process of bidirectional communication according to this embodiment. By switching the modes of devices in the sequence represented in the following flowchart, the devices sequentially become a master and a slave and can mutually transmit desired files.

In each of devices A and B, a communication direction managing unit 12 generates a random number (Step S401) and is in a connection request waiting state (Step S402).

In the devices A and B, in a case where a connection request data frame is not received from an opposing device (No in Step S403), the communication direction managing unit 12 continues this state (connection request waiting state) until a random number time that is based on the generated random number elapses (No in Step S404). Then, in a case where the random number time elapses, in other words, in a case where a connection request data frame has not been received from the opposing device during the connection request waiting state (Yes in Step S404), after waiting for the connection request is stopped (Step S405), the communication direction managing unit 12 sets the mode of the device to which it belongs as a master again. Here, as an example, a case will be described in which the device A has a generated random number smaller (a random number time is shorter) than that of the device B and has not received a connection request data frame from the opposing device during the connection request waiting state (Yes in Step S404). In addition, in a case where a connection request data frame has been received from the opposing device (Yes in Step S403), the communication direction managing unit 12 causes the process to proceed to the process of Step S416.

In the device A, the communication control unit 14 transmits a connection request data frame (Step S406) and, in a case where a connection response data frame has not been received from the device B (No in Step S407), continuously transmits the connection request data frame on a regular basis until the connection response data frame is received (Step S406).

In the device A, when the connection response data frame is received from the device B (Yes in Step S407), the communication control unit 14 compares a UID included in the connection response data frame with a UID of the opposing device at the time of the previous connection (Step S408). In a case where the UIDs do not match each other (No in Step S408), the communication control unit 14 ends the bidirectional communication. On the other hand, in a case where the UIDs match each other (Yes in Step S408), the communication control unit 14 notifies an application unit 11 of the establishment of a connection (Step S409). The application unit 11 performs a connection as a master (Step S409).

In the device A, the transmission condition information managing unit 13 acquires transmission condition information from the device B of the slave side (Step S410) and determines a master process for the device B of the slave side based on the acquired information. More specifically, selection of a file to be transmitted and the like are performed, and details thereof will be described in an embodiment to be described later.

In the device A, the application unit 11 performs a master processes such as push transmission or pull reception in accordance with the master process determined by the transmission condition information managing unit 13 (Step S411).

When the master process is completed, in the device A, the communication direction managing unit 12 transmits a cut-off request data frame to the device B (opposing device) of the slave side together with a master process completion notification, thereby cutting off the connection with the opposing device once (Step S412).

The communication direction managing unit 12 checks whether or not a process of bidirectional communication of the master side and the slave side has been completed (Step S413). In a case where the process of bidirectional communication of the master side and the slave side has not been completed (No in Step S413), the communication direction managing unit 12 sets a slave as a mode that has not been completed yet, here, the mode of the application unit 11, and the communication control unit 14 is in a connection waiting state in the slave mode (Step S414). On the other hand, in a case where the process of bidirectional communication is completed (Yes in Step S414), the communication direction managing unit 12 ends the bidirectional communication.

In the device A, the communication control unit 14 waits until a connection request data frame is received from the device B (No in Step S415). When the connection request data frame is received (Yes in Step S415), the communication control unit 14 transmits a connection response data frame (Step S416).

In the device A, the communication control unit 14 compares a UID included in the connection request data frame transmitted from the device B with the UID of the opposing device at the time of the previous connection (Step S417). In a case where the UIDs do not match each other (No in Step S417), the communication control unit 14 ends the bidirectional communication. On the other hand, in a case where the UIDs match each other (Yes in Step S417), the communication control unit 14 notifies the application unit 11 of the establishment of a connection (Step S418). The application unit 11 performs a connection as a slave (Step S418).

In the device A, the application unit 11 performs a process (a data reception process according to a push from the device B that is a master, a data transmission process according to pull, and the like) of the slave side (Step S419).

In the device A, when the slave process is completed, the communication control unit 14 waits for a cut-off request data frame transmitted from the device B (Step S420). The communication control unit 14 waits until the cut-off request data frame is received from the device B (No in Step S421) and cuts off the connection with the device B when the cut-off request data frame is received (Yes in Step S421).

The communication direction managing unit 12 checks whether or not the process of bidirectional communication of the master side and the slave side has been completed (Step S422). In a case where the process of bidirectional communication of the master side and the slave side has been completed (Yes in Step S422), the communication direction managing unit 12 ends the bidirectional communication. On the other hand, in a case where the process of the bidirectional communication of the master side and the slave side has not been completed (No in Step S422), the communication direction managing unit 12 sets a master as a mode that has not been completed, here, the mode of the application unit 11, and the communication control unit 14 transmits a connection request data frame as the master mode (Step S406).

In this way, the device A performs the process in order of Steps S401 to S422 and ends the process of the bidirectional communication. On the other hand, since Step S403: No is satisfied, the device B performs the process in order of Steps of S401 to S403, S416 to S422, and S406 to S413 and ends the process of the bidirectional communication. In any of the devices, by making a connection to an opposing device by performing switching between the master and the slave, communication in each mode can be performed.

In the file transmission/reception process illustrated in FIG. 3 and the process of the bidirectional communication illustrated in FIG. 10, there are several processes of the devices A and B cutting off the connection once and making reconnection. However, a case may be considered in which the reconnection cannot be made due to detachment of the opposing device during the cutting-off of the connection, breakdown of the opposing device, or the like. Accordingly, in the devices A and B, in a case where a reconnection to the opposing device cannot be made for a predetermined period or more in the reconnection process, the bidirectional process ends in the middle of the process.

In this embodiment, a sequence diagram (see FIG. 6) of the file transmission/reception process performed in the devices A and B, a diagram (see FIG. 7) that illustrates the mode transitions of each device, and examples (see FIGS. 8 and 9) of the display in the communication device are similar to those of the first embodiment.

In addition, in this embodiment, while the timing for switching each device to the master is based on a generated random number, the present invention is not limited thereto. Since the timing for switching each device to the master only needs to be configured to be changed, any time parameter other than a random number may be used.

Furthermore, it may be configured such that each device exchanges the information of random numbers according to this embodiment with the opposing device, similar to the first embodiment, the random numbers are substituted by UIDs, and a master or a slave is determined based on the magnitude relation between the random numbers.

According to the second embodiment, the communication device 1 that is a file transmission/reception device, in a case where a conflict occurs between the communication device and the opposing device due to the same mode, generates a random number and operates as a slave. Thereafter, in a case where a random number time has elapsed without receiving a connection request data frame from the opposing device, the communication device 1 is switched to the master mode and performs a process of the master mode by transmitting a connection request data frame to the opposing device. On the other hand, in a case where a connection request data frame is received from the opposing device before the random number time elapses, the communication device 1 performs the process of the slave mode, after performing the process of one mode, switches the mode together with the opposing device, and performs the process of the other mode for performing communication. As a result, an advantage of being capable of resolving a conflict and transmitting/receiving a file between the device and the opposing device even in a case where the conflict occurs between the communication device and the opposing device can be acquired.

In addition, different from the first embodiment, bidirectional communication can be performed without exchanging information other than a UID identifying the opposing device between the communication device and the opposing device.

Third Embodiment

In this embodiment, the process of unidirectional communication (Step S113 represented in FIG. 3) according to the first embodiment, in other words, a case where one of devices A and B is not compliant with a bidirectional communication operation according to the first (or second) embodiment (No in Step S111 represented in FIG. 3) will be described. Here, while the devices A and B can perform the TransferJet communication, only the device A is compliant with the bidirectional communication described in the first (or the second) embodiment, but the device B is not compliant with the bidirectional communication described in the first (or the second) embodiment.

The device B does not have a bidirectional communication function and thus cannot be automatically switched to a slave mode. Accordingly, even in a case where a conflict occurs as the device A compliant with the bidirectional communication is switched to the slave mode, unidirectional communication can be realized.

Figure 11:
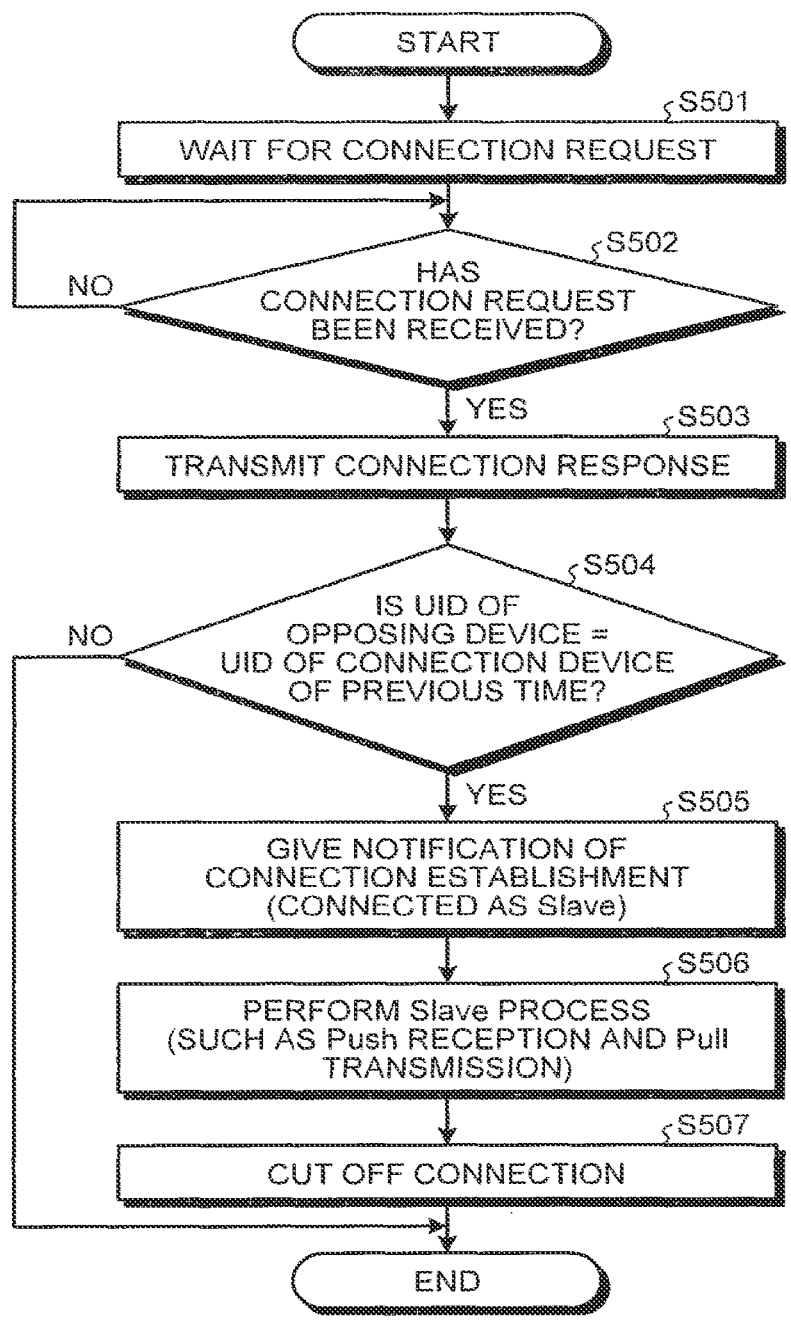
FIG. 11 is a flowchart that illustrates a unidirectional communication process according to a third embodiment.

FIG. 11 is a flowchart that illustrates a unidirectional communication process according to this embodiment. According to the sequence represented in the following flowchart, a desired file can be transmitted from the device B to the device A. The file transmission/reception process (Steps S101 to S111 represented in FIG. 3) up to the process of the unidirectional communication (Step S113) is as described above.

In the devices A and B, in a case where the opposing device is not compliant with the operation of the bidirectional communication according to this embodiment (No in Step S111), the unidirectional communication process is performed (Step S113), and the communication with the opposing device ends (Step S114).

At this time, in the device A that is compliant with the operation of the bidirectional communication, since the device B that is the opposing device is not compliant with the operation of the bidirectional communication, the communication direction managing unit 12 sets a slave as the mode of the application unit 11 of the device to which it belongs and is in a connection request waiting state (Step S501).

In the device A, the communication control unit 14 waits until a connection request data frame is received from the device B (No in Step S502). When the connection request data frame is received (Yes in Step S502), the communication control unit 14 transmits a connection response data frame (Step S503).

In the device A, the communication control unit 14 compares a UID included in the connection request data frame transmitted from the device B with the UID of the opposing device at the time of the previous connection (Step S504). In a case where the UIDs do not match each other (No in Step S504), the communication control unit 14 ends the unidirectional communication. On the other hand, in a case where the UIDs match each other (Yes in Step S504), the communication control unit 14 notifies the application unit 11 of the establishment of a connection (Step S505). The application unit 11 performs a connection as a slave (Step S505).

In the device A, the application unit 11 performs a process (a data reception process according to a push from the device B that is a master, a data transmission process according to pull, and the like) of the slave side (Step S506).

In the device A, when the slave process is completed, the communication control unit 14 cuts off the connection with the device B by transmitting a cut-off process to the device B (Step S507). Then, since the unidirectional process is completed, the communication ends.

Figure 12:
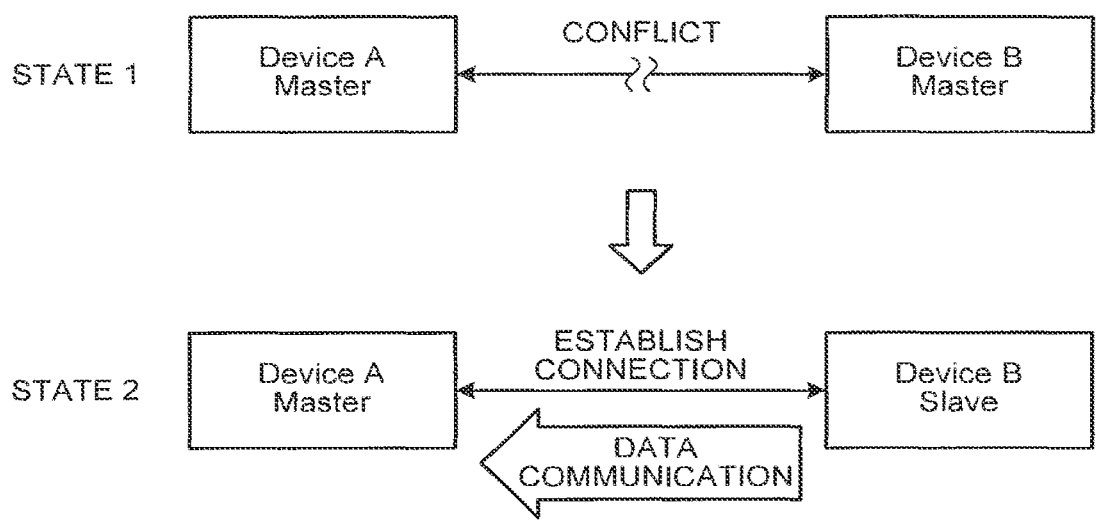
FIG. 12 is a diagram that illustrates mode transitions of each device.

FIG. 12 is a diagram that illustrates mode transitions of each device. First, as State 1, since devices A and B make connection requests as masters, a conflict occurs, and accordingly, communication cannot be performed. At this time, data frames are transmitted/received between the devices A and B, and the device A is aware that the device B that is the opposing device is not compliant with bidirectional communication based on the version information included in the data frame. Accordingly, the device A, as State 2, operates as a slave and can establish a connection with the device B that is the master, and thus data communication can be performed from the device B.

Figure 13:
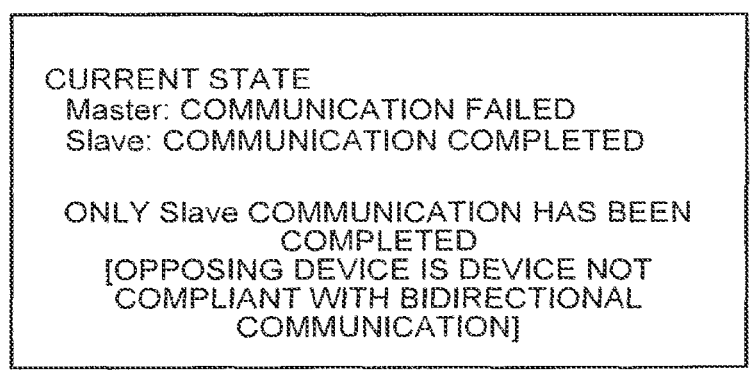
FIG. 13 is a diagram that illustrates an example of a display after completion of unidirectional communication in a communication device.

FIG. 13 is a diagram that illustrates an example of a display after completion of the unidirectional communication in the communication device 1. In the device A, the master process as the unidirectional/bidirectional communication process fails, and the slave process is completed and, by displaying the completion of only the slave communication, the state of the device A can be represented to the user. At this time, an error display for giving a notification representing that the opposing device is a device not compliant with the bidirectional communication may be displayed.

According to the third embodiment, the communication device 1 that is a file transmission/reception device, in a case where a conflict occurs between the communication device and the opposing device due to the same mode, operates in the slave mode and performs only the unidirectional communication having the opposing device as the master in a case where the opposing device is not compliant with the bidirectional communication according to the first (or the second) embodiment. As a result, an advantage of realizing the unidirectional communication in a direction from the bidirectional communication non-compliant device to the bidirectional communication-compliant device even in a case where a conflict occurs can be acquired.

Fourth Embodiment

In this embodiment, a function of automatically limiting a file to be transmitted based on transmission condition information acquired from a slave device when a master device transmits data to the slave device will be described.

More specifically, the use of a removable device (an SD card, an SDIO card, a dongle, or the like) as a device having a radio communication function will be considered. In a case where the device having the radio communication function is a removable device, this device may be considered to be used by being replaced by various host devices. Accordingly, there are cases where information of a communication partner (host device) cannot be specified based on a UID of the device. Accordingly, in order to identify the communication partner, information of a host device type and a serial number is used.

Figure 14:
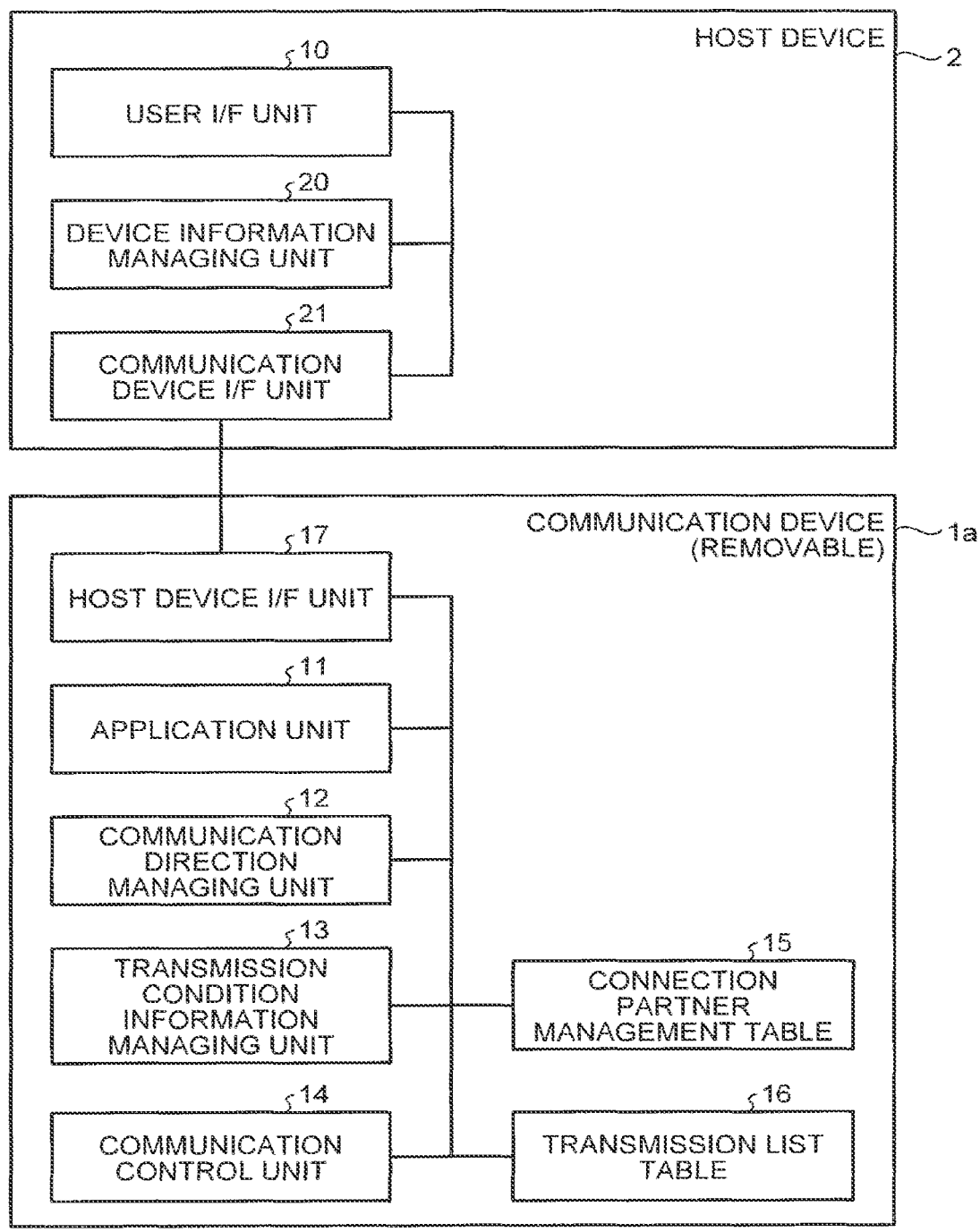
FIG. 14 is a diagram that illustrates an example of the configurations of a communication device and a host device according to a fourth embodiment.

FIG. 14 is a diagram that illustrates an example of the configurations of a communication device 1a and a host device 2 according to this embodiment. The communication device 1a that is a file transmission/reception device, for example, as described above, is a removable device such as an SD card, an SDIO card, or a dongle. However, the communication device 1a is not limited thereto. In addition, the host device 2, for example, is a digital camera, a personal computer (PC), or the like. However, the host device 2 is not limited thereto.

The communication device 1a includes: an application unit 11; a communication direction managing unit 12; a transmission condition information managing unit 13; a communication control unit 14; a connection partner management table 15; a transmission list table 16; and a host device I/F unit 17. The host device I/F unit 17 is an interface that transmits/receives data to/from the host device 2.

In the communication device 1a, the transmission condition information managing unit 13 acquires information (a serial number, a user name, and the like) of the host device 2 from the device information managing unit 20 of the host device 2 through the host device I/F unit 17.

The host device 2 includes: a user I/F unit 10; a device information managing unit 20; and a communication device I/F unit 21. The device information managing unit 20 manages information of the host device 2 such as a serial number of the host device 2, and a "user name" input from a user. The communication device I/F unit 21 is an interface that transmits/receives data to/from the communication device 1a.

Figure 15:
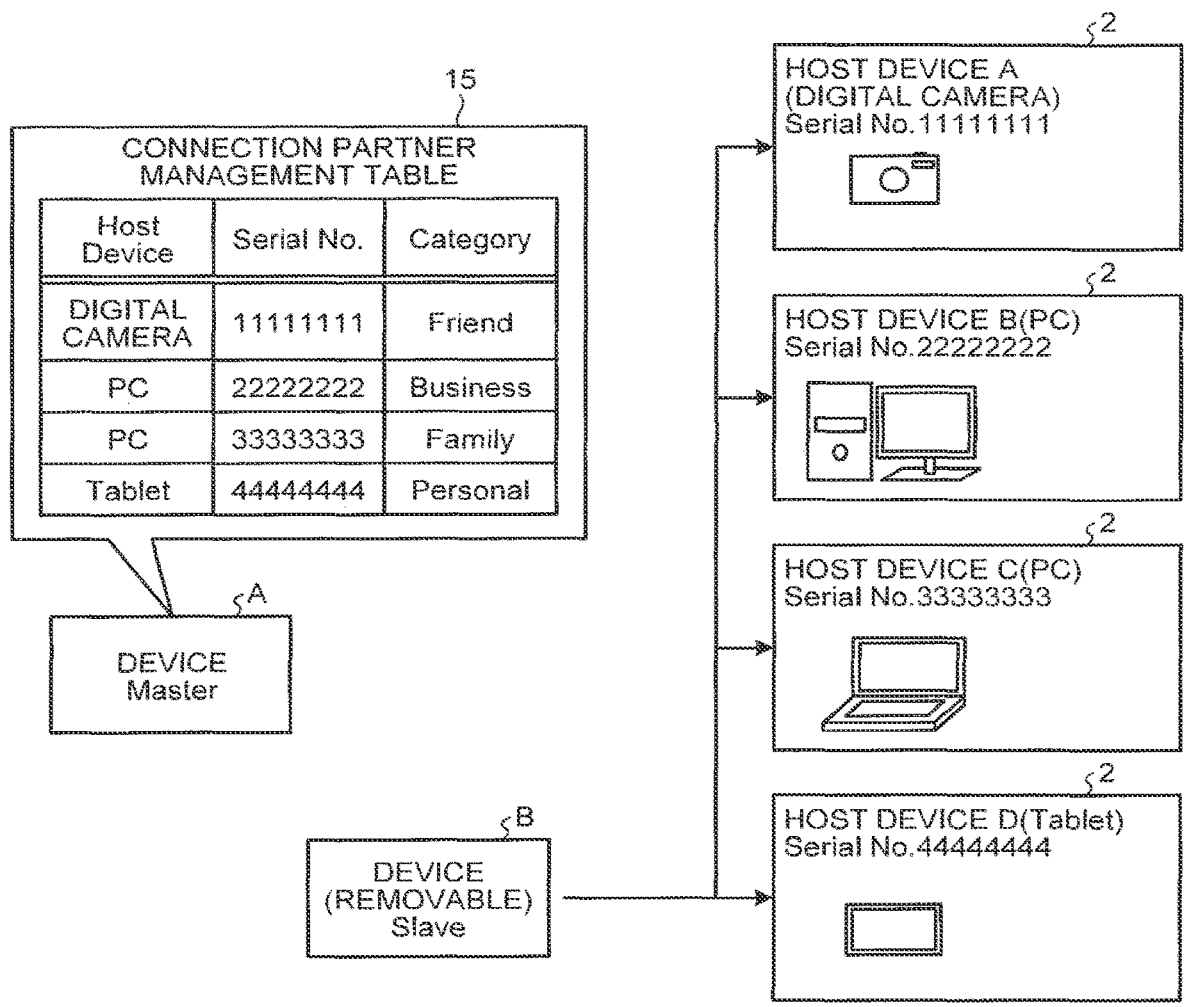
FIG. 15 is a diagram that illustrates an example of the configuration of devices and a connection partner management table according to the fourth embodiment.

Next, a file transmission process according to this embodiment will be described. FIG. 15 is a diagram that illustrates an example of the configuration of devices and a connection partner management table 15 according to this embodiment. For example, the device A is the communication device 1 having the configuration illustrated in FIG. 1, and the device B is the communication device 1a having the configuration illustrated in FIG. 14. Here, the device A may be configured as the communication device 1a having the configuration illustrated in FIG. 14. FIG. 15 illustrates that the device B can be connected to four host devices 2 (host devices A, B, C, and D). In order to actually communicate with the device A, the device B is connected to one host device 2.

In the case illustrated in FIG. 15, in the devices A and B having the radio communication function, it is assumed that the device A operates as a transmission-side device (master), and the device B operates as a reception-side device (slave). The device B is a removable device and thus can be inserted into various host devices 2, and the radio communication function can be added to the host device 2.

First, the device A that is the master side, before performing transmission, registers a "host device type" of each host device 2 and a "serial number of the host device" in the connection partner management table 15 through the user I/F unit 10 in accordance with an input from a user and registers a category ("Family", "Business", "Friend", "Personal", or the like) to which the host device 2 belongs.

The transmission condition information managing unit 13 of the device A sets a category that may be transmitted for each file to be transmitted and registers the categories in the transmission list table 16. The transmission condition information managing unit 13 of the device A may select a plurality of categories that may be transmitted for each file.

In the device B, the transmission condition information managing unit 13 of the communication device 1a acquires the information of the "host device type" and the "serial number of the host device" from the device information managing unit 20 of the host device 2 through the host device I/F unit 17 and the communication device I/F unit 21 and stores the acquired information as transmission condition information.

When a connection between the device A and the device B is established, the transmission condition information managing unit 13 of the device A that is the master side acquires the information (the "host device type" and the "serial number of the host device") of the host device 2 to which the device B is connected from the device B that is the slave side as the transmission condition information.

In the device A, in a case where the acquired information of the host device 2 is included in the connection partner management table 15, the category of the partner device can be specified, and accordingly, the transmission condition information managing unit 13 transmits only files that match the category among files included in the transmission list table 16. In addition, to the host devices 2 of which the categories are "Personal", the transmission condition information managing unit 13 may transmit files with a condition such as transmission of all the files being designated. In a case where the acquired information of the host device 2 is not included in the connection partner management table 15, the transmission condition information managing unit 13 transmits only files of which categories are "Guest".

Figure 16:
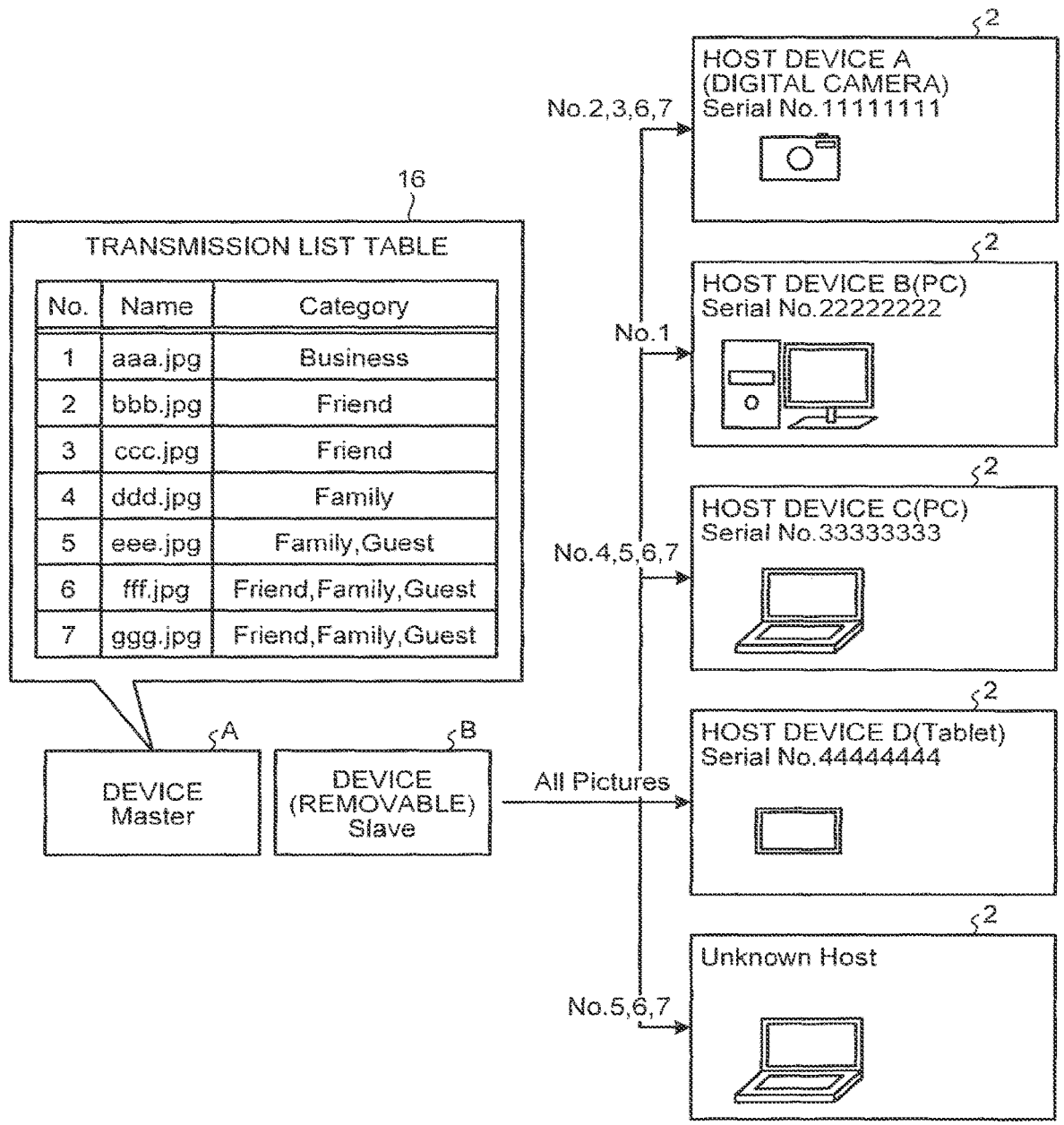
FIG. 16 is a diagram that illustrates an example of the configuration of devices and a transmission list table according to the fourth embodiment.

FIG. 16 is a diagram that illustrates an example of the configuration of devices and a transmission list table 16 according to this embodiment. The device A having the transmission list table 16 illustrated in FIG. 16 transmits files as illustrated below in a case where the device B that is a removable device is inserted to each host device 2.

In a case where the device B is inserted into the host device 2 (host device A) of which category is registered as "Friend" for communication, the device A transmits files of Nos. 2, 3, 6, and 7.

In a case where the device B is inserted into the host device 2 (host device B) of which category is registered as "Business" for communication, the device A transmits a file of No. 1.

In a case where the device B is inserted into the host device 2 (host device C) of which category is registered as "Family" for communication, the device A transmits files of Nos. 4, 5, 6, and 7.

In a case where the device B is inserted into the host device 2 (host device D) of which category is registered as "Personal" for communication, the device A transmits all the files.

On the other hand, in a case where the device B is inserted into the host device 2 that is not registered, the device A handles the host device 2 as a "Guest" and transmits files of Nos. 5, 6, and 7.

Here, while a case has been described in which files are transmitted from the device A to the device B, files may be transmitted from the device B to the device A. In such a case, in a case where data (file) satisfying the transmission condition is not present in one device, a display may be performed as illustrated in FIG. 17. FIG. 17 is a diagram that illustrates an example of a display after completion of bidirectional communication in the communication device 1a. In a case where data satisfying the transmission condition is not present, by performing an error display indicating no presence of the data, the state of the communication device can be represented to a user.

According to the fourth embodiment, in the communication device 1 or the communication device 1a that is a file transmission/reception device, in a case where the opposing device is a removable device (communication device 1a) having the radio communication function, since the opposing device may be considered to be used by being replaced by various host devices 2, the information of the "host device type" of the host device 2 and the "serial number of the host device" is used for the identification of the communication partner. As a result, by setting the connection partner management table 15 and the transmission list table 16, an advantage of setting a file to be transmitted for each host device 2 can be acquired.

Fifth Embodiment

In this embodiment, a function of automatically limiting a file to be transmitted based on transmission condition information acquired from a slave device when a master device transmits data to the slave device will be described as a method different from that of the fourth embodiment.

In this embodiment, a user name is used for the identification of a communication partner. In addition, the configuration of the device B side is similar to the configuration illustrated in FIG. 14 that has been described in the fourth embodiment.

Figure 18:
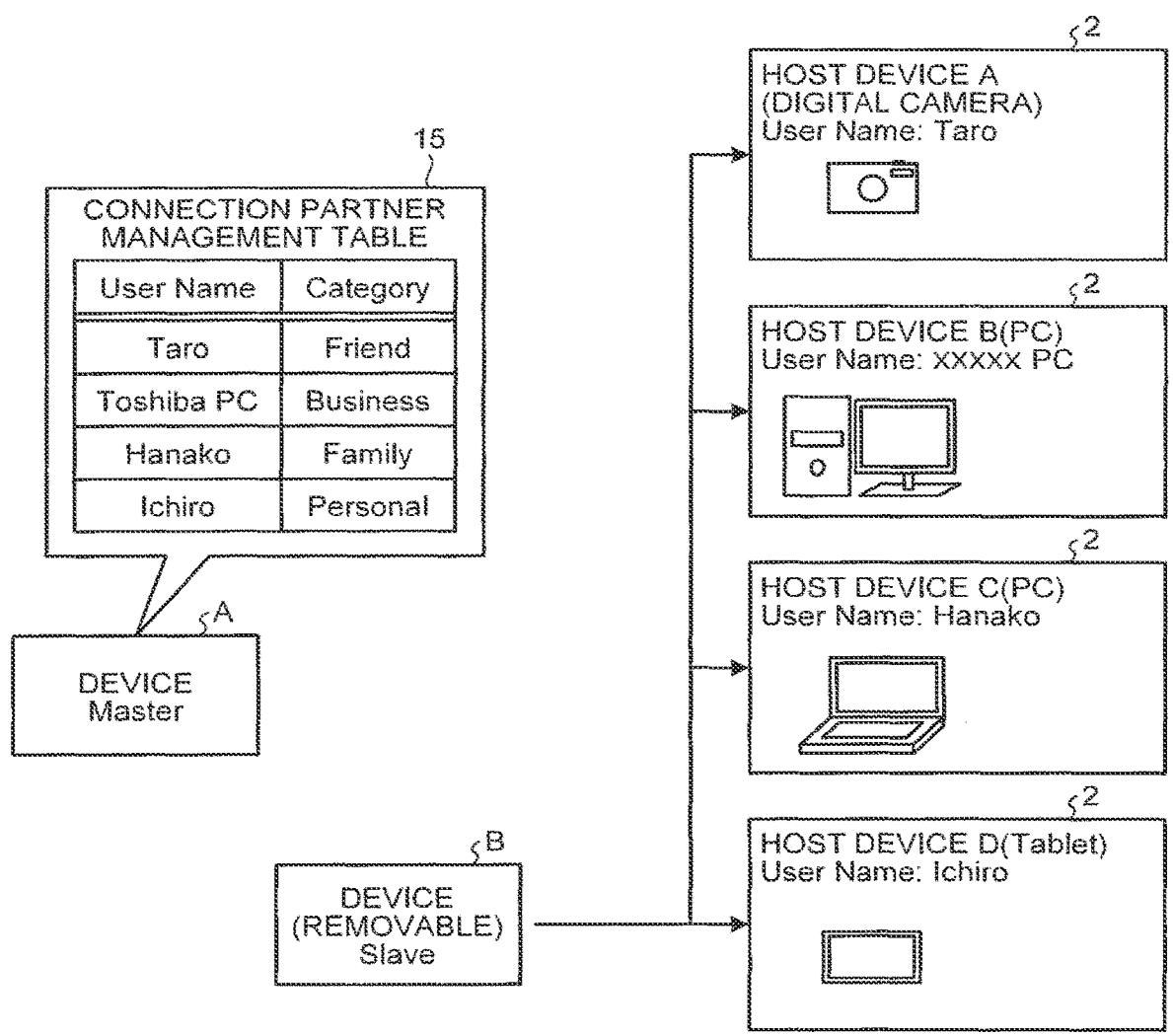
FIG. 18 is a diagram that illustrates an example of the configuration of devices and a connection partner management table according to a fifth embodiment.

Next, a file transmission process according to this embodiment will be described. FIG. 18 is a diagram that illustrates an example of the configuration of devices and a connection partner management table 15 according to this embodiment. For example, the device A is the communication device 1 having the configuration illustrated in FIG. 1, and the device B is the communication device 1a having the configuration illustrated in FIG. 14. Here, the device A may be configured as the communication device 1a having the configuration illustrated in FIG. 14.

First, the device A that is the master side, before performing transmission, registers a "user name" of each host device 2 and a category ("Family", "Business", "Friend", "Personal", or the like) to which the host device 2 belongs in the connection partner management table 15 through the user I/F unit 10 in accordance with an input from a user.

The transmission condition information managing unit 13 of the device A sets a category that may be transmitted for each file to be transmitted and registers the categories in the transmission list table 16. The transmission condition information managing unit 13 of the device A may select a plurality of categories that may be transmitted for each file.

In the device B, the user registers a "user name" in each host device 2 through the user I/F unit 10 of each host device 2, and the device information managing unit 20 of each host device 2 stores the registered user name.

In the device B, the transmission condition information managing unit 13 of the communication device 1a acquires information of the "user name" from the device information managing unit 20 of the host device 2 through the host device I/F unit 17 and the communication device I/F unit 21 and stores the acquired information as transmission condition information.

When a connection between the device A and the device B is established, the transmission condition information managing unit 13 of the device A that is the master side acquires the information (the "user name") of the host device 2 to which the device B is connected from the device B that is the slave side as the transmission condition information.

In the device A, in a case where the acquired information of the host device 2 is included in the connection partner management table 15, the category of the partner device can be specified, and accordingly, the transmission condition information managing unit 13 transmits only files that match the category among files included in the transmission list table 16. In addition, to the host devices 2 of which the categories are "Personal", the transmission condition information managing unit 13 may transmit files with a condition such as transmission of all the files being designated. In a case where the acquired information of the host device 2 is not included in the connection partner management table 15, the transmission condition information managing unit 13 transmits only files of which categories are "Guest".

Figure 19:
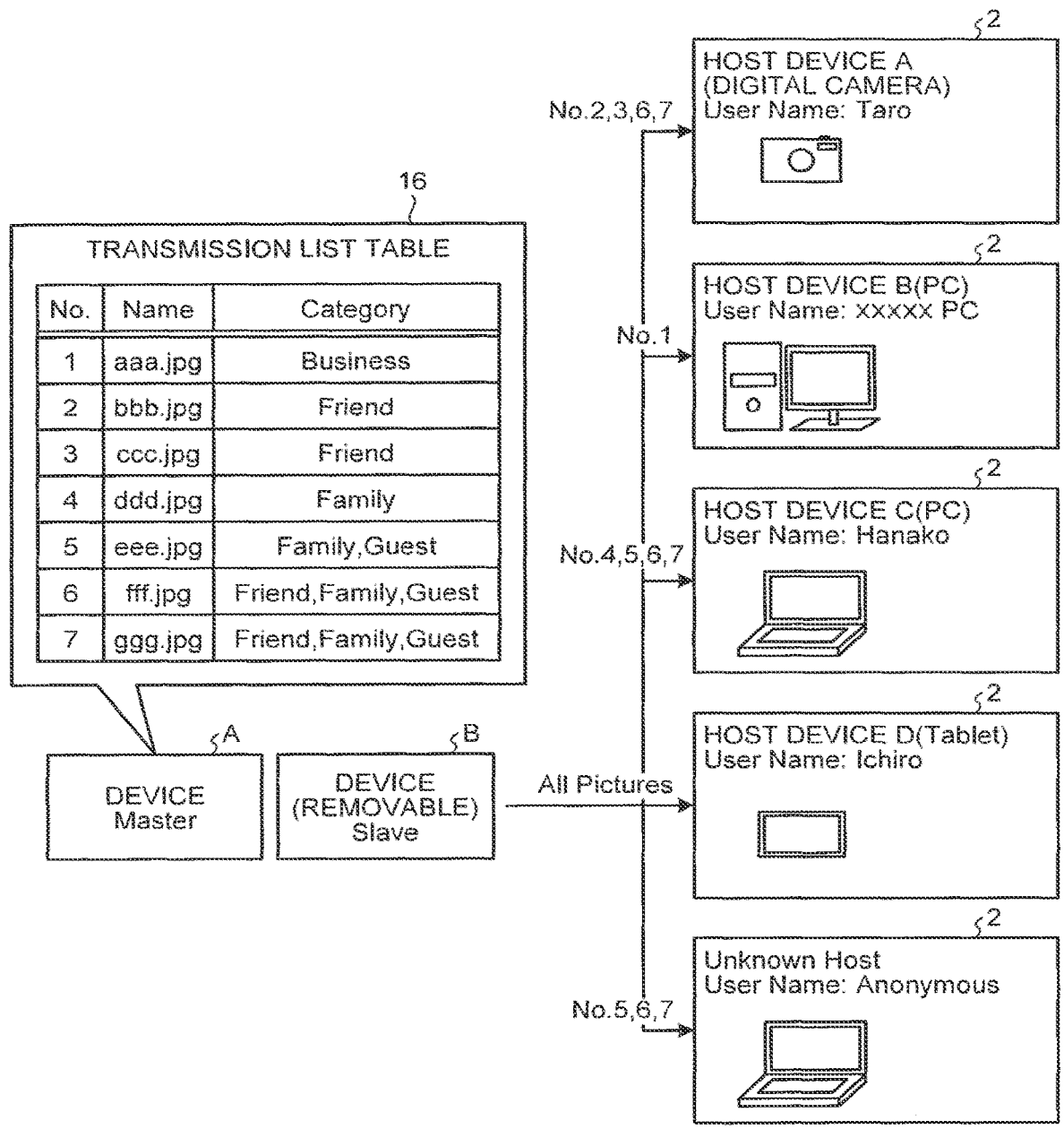
FIG. 19 is a diagram that illustrates an example of the configuration of devices and a transmission list table according to the fifth embodiment.

FIG. 19 is a diagram that illustrates an example of the configuration of devices and a transmission list table 16 according to this embodiment. The device A having the transmission list table 16 illustrated in FIG. 19 transmits files as illustrated below in a case where the device B that is a removable device is inserted to each host device 2.

In a case where the device B is inserted into the host device 2 (host device A) of which category is registered as "Friend" for communication, the device A transmits files of Nos. 2, 3, 6, and 7.

In a case where the device B is inserted into the host device 2 (host device B) of which category is registered as "Business" for communication, the device A transmits a file of No. 1.

In a case where the device B is inserted into the host device 2 (host device C) of which category is registered as "Family" for communication, the device A transmits files of Nos. 4, 5, 6, and 7.

In a case where the device B is inserted into the host device 2 (host device D) of which category is registered as "Personal" for communication, the device A transmits all the files.

On the other hand, in a case where the device B is inserted into the host device 2 that is not registered, the device A handles the host device 2 as a "Guest" and transmits files of Nos. 5, 6, and 7.

According to the fifth embodiment, in the communication device 1 or the communication device 1a that is a file transmission/reception device, in a case where the opposing device is a removable device (communication device 1a) having the radio communication function, since the opposing device may be considered to be used by being replaced by various host devices 2, the information of the "user name" of the host device 2 is used for the identification of the communication partner. As a result, by setting the connection partner management table 15 and the transmission list table 16, an advantage of setting a file to be transmitted for each host device 2 can be acquired.

Sixth Embodiment

According to the fourth and fifth embodiments, the method of automatically limiting a file to be transmitted based on the transmission condition information has been described. Here, as a method of transmitting files in near field communication, in addition to a method of transmitting all the files stored in a medium, there are several methods such as a method of transmitting files of only a certain period. In this embodiment and the subsequent embodiments, a difference transmission method will be described. In the first to fifth embodiments, while a communication device that is a file transmission/reception device is represented as the device, hereinafter, for description of a file transmission method, in order to allow the transmission side and the reception side of the file to be easily determined, the communication device may be represented as a transmission device or a reception device.

Figure 20:
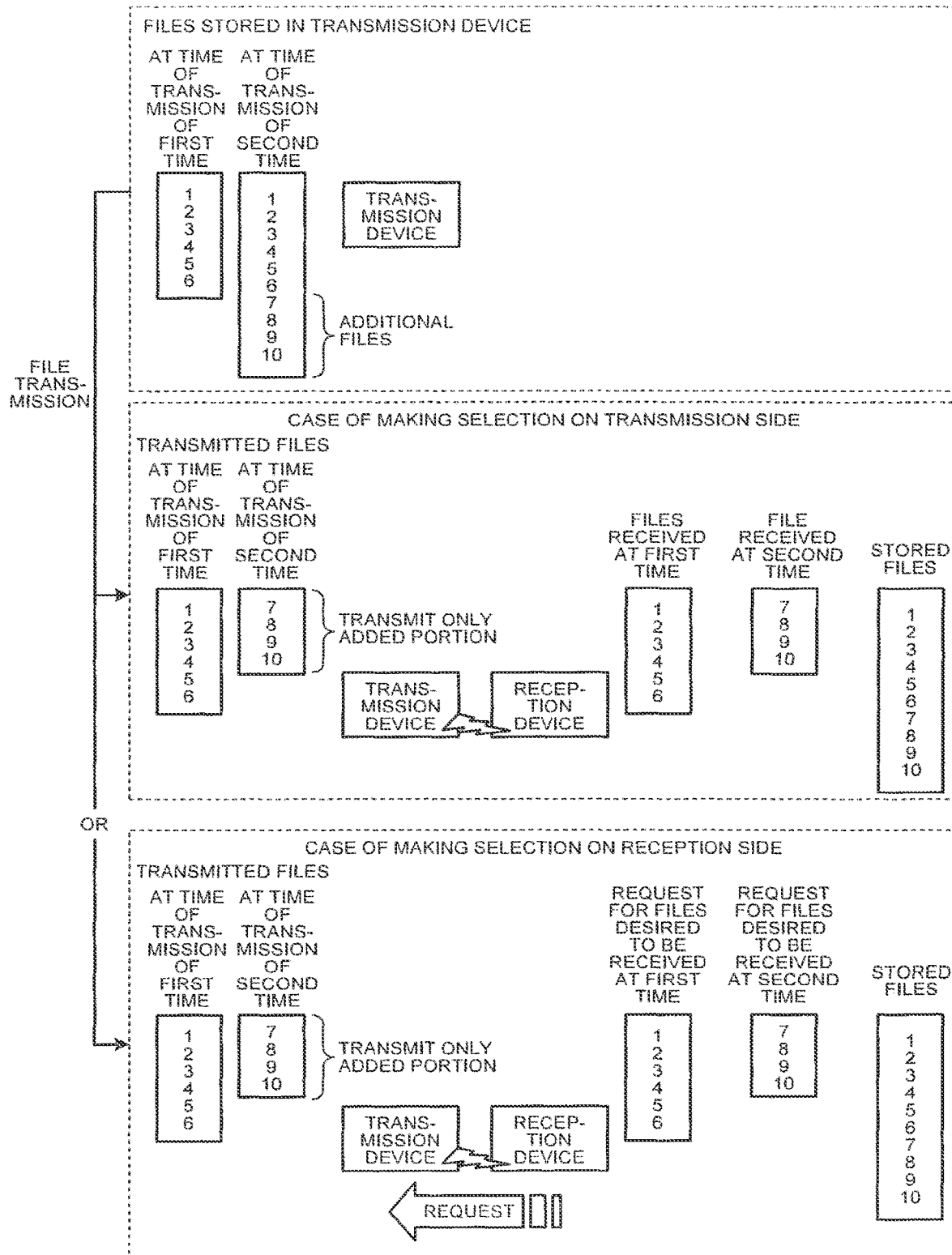
FIG. 20 is a diagram that illustrates a basic difference transmission method.

FIG. 20 is a diagram that illustrates a basic difference transmission method. In the transmission device, files 1 to 6 are assumed to be present at the time of the first transmission, and files 1 to 10 are assumed to be present at the time of the second transmission.

As the difference transmission method, there is a method for making a selection on the transmission side in which a transmission device and a reception device are present, and, in a case where the transmission device performs a transmission process for a same reception device several times, in order not to duplicately transmit the same file, before transmitting a file, the file is compared with a past transmission content of a transmission history, and only a newly-added file is transmitted. The transmission device selects only an added portion (files 7 to 10) and transmits the selected added portion to the reception device.

In addition, as another difference transmission method, there is a method for making a selection on the reception side in which a transmission device and a reception device are present, and, after transmission history files thereof are exchanged, in a case where there are additional files on the transmission device side when files are compared with a past reception content, the reception device requests files desired to be received from the transmission device so as to cause the files to be transmitted from the transmission device. The reception device selectively requests an additional portion (files 7 to 10) as files desired to be received, and the transmission device transmits the requested files 7 to 10 to the reception device.

Figure 21:
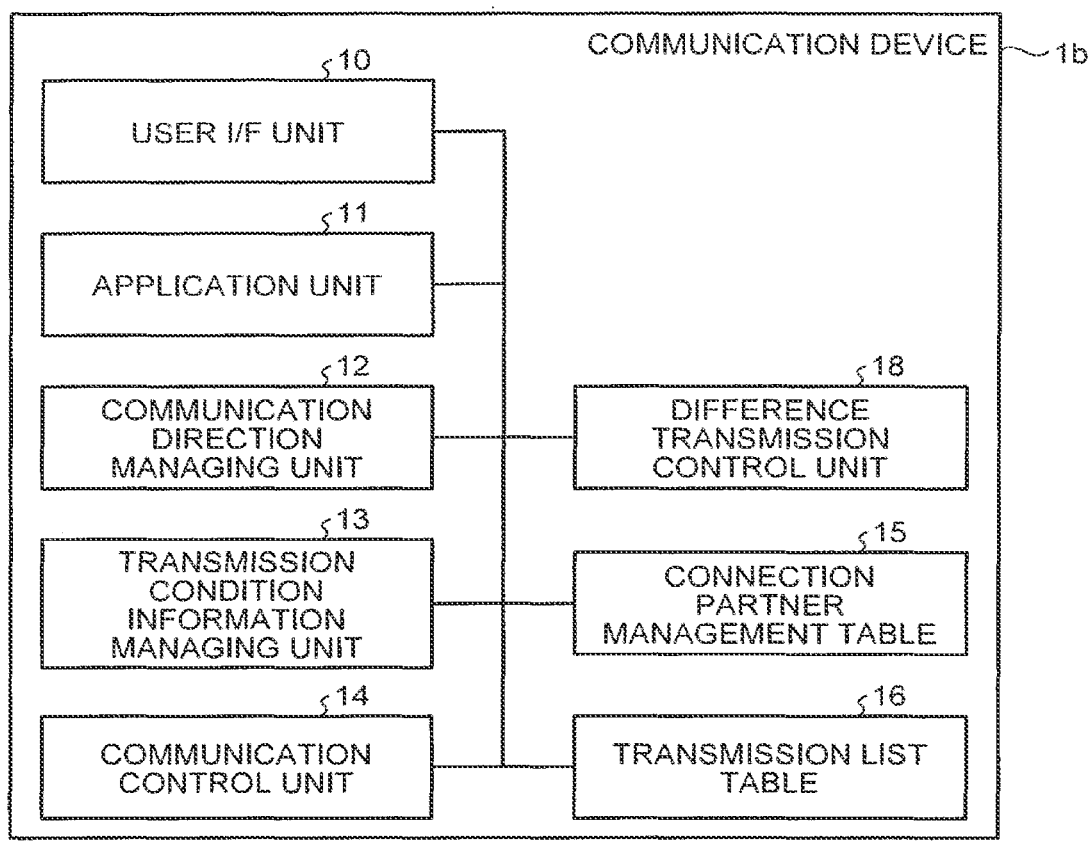
FIG. 21 is a diagram that illustrates an example of the configuration of a communication device according to a sixth embodiment.

FIG. 21 is a diagram that illustrates an example of the configuration of the communication device 1b according to this embodiment. The communication device 1b that is a file transmission/reception device includes: a user I/F unit 10; an application unit 11; a communication direction managing unit 12; a transmission condition information managing unit 13; a communication control unit 14; a connection partner management table 15; a transmission list table 16; and a difference transmission control unit 18. The difference transmission control unit 18 generates a transmission history (transmission information and reception information) for each connected device, stores the transmission histories in a memory area every time when the transmission is completed, and compares the transmission histories at the next transmission time, thereby performing control such that the same data is not duplicately transmitted. As the software configuration of the difference transmission control unit 18, the configuration of applications in the application layer illustrated in FIG. 2 is employed.

Figure 22:
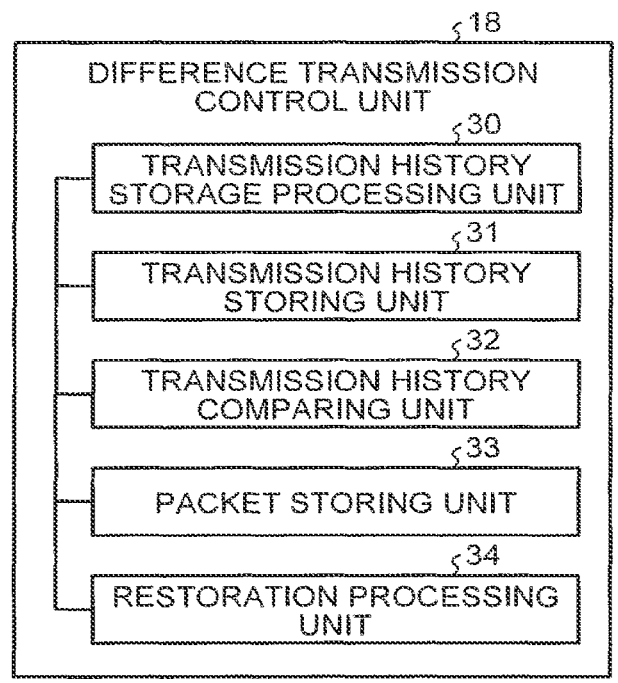
FIG. 22 is a diagram that illustrates an example of the configuration of a difference transmission control unit according to the sixth embodiment.

FIG. 22 is a diagram that illustrates an example of the configuration of the difference transmission control unit 18 according to this embodiment. The difference transmission control unit 18 includes: a transmission history storage processing unit 30; a transmission history storing unit 31; a transmission history comparing unit 32; a packet storing unit 33; and a restoration processing unit 34.

The transmission history storage processing unit 30 stores information of files stored in a storage unit, which is not illustrated in the figure, of the communication device 1b and files that are transmitted/received to/from other devices in the transmission history storing unit 31.

The transmission history storing unit 31 is a storage unit that stores the information of files stored in the storage unit, which is not illustrated in the figure, of the communication device 1b and files transmitted/received to/from other devices as a transmission history list.

The transmission history comparing unit 32 compares the transmission history of the device to which it belongs, which is stored in the transmission history storing unit 31, with the transmission history acquired from the opposing device. Here, the transmission history storing unit 31 may be arranged inside a storage unit, which is not illustrated in the figure, arranged inside the communication device 1b and used for storing files and the like instead of being arranged inside the difference transmission control unit 18.

When a file is received from another device, the packet storing unit 33 temporarily stores successfully received packets in a case where there is a packet that has not been received from among packets configuring the file.

The restoration processing unit 34 restores the file by using the packets stored in the packet storing unit 33 and remaining packets configuring the file that have been newly received.

Figure 23:
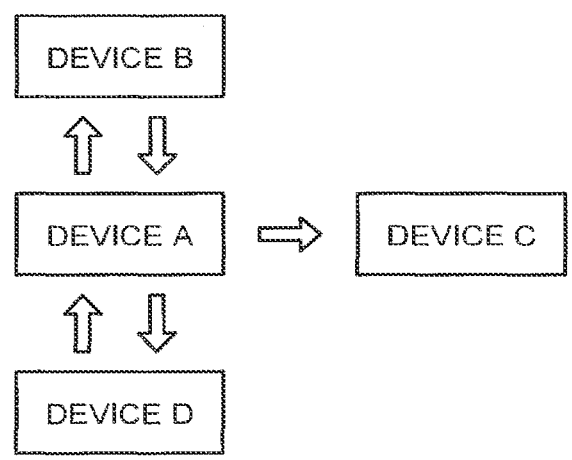
FIG. 23 is a diagram that illustrates a file transmission relation with a device A being considered as the center.

FIG. 23 is a diagram that illustrates a file transmission relation with a device A being considered as the center. Here, it is assumed that there are four devices A, B, C, and D as the communication devices 1b, and the device A can transmit/receive files to/from the other devices B, C, and D.

FIG. 24 is a diagram that illustrates an example of the configuration of the transmission history list stored in the transmission history storing unit 31 of the device A. FIG. 25 is a diagram that illustrates an example of the configuration of the transmission history list stored in the transmission history storing unit 31 of the device B. The transmission history list stores: a category of transmission or reception; a partner device ID of a file transmission/reception target; a file name of a file that is transmitted or received; update date and time for the file; a size of the file; a packet representing packet information of packets that have been successfully received in a case where transmission is interrupted; and information of a status representing a state such as a transmission-completed state, no transmission, transmission prohibition, or reception prohibition.

The partner device ID is actually represented by a hexadecimal number like a MAC address and is unique, and any other device does not have the same opposing device ID. In addition, the partner device ID may be a unique ID that can specify a device called a UID in TransferJet, a user identification ID of a higher level, a host device ID (serial number), or the like.

In addition, the update date and time is actually represented by the number of seconds of the coordinated universal time (UTC) or the like and, here, is represented by date for easy understanding. Furthermore, while date information as update date and time is a date on which a file is generated, there is also a method in which the date information is managed by each device as individual date. For example, date on which a file is generated by the device or date on which the file is copied in a case where the file is copied may be used.

The transmission prohibition, the reception prohibition, and the like of the status can be intentionally set by the user by using the partner device ID or the like. A file of which the status is the transmission prohibition is not set as a transmission target.

In the description presented above, while the transmission history list is configured as one file by dividing transmission histories into categories of the transmission and the reception and listing transmission histories until now for each partner device ID of each category, such a configuration is an example, and the transmission history list is not limited thereto. For example, there are several patterns including a pattern of a case where files are divided for each partner device ID, and transmission histories of the transmission and the reception until now are formed for each file as a list and the like.

In each device, since each device can be identified based on the partner device ID, histories of file transmission and file reception can be stored for a plurality of devices.

Figure 26:
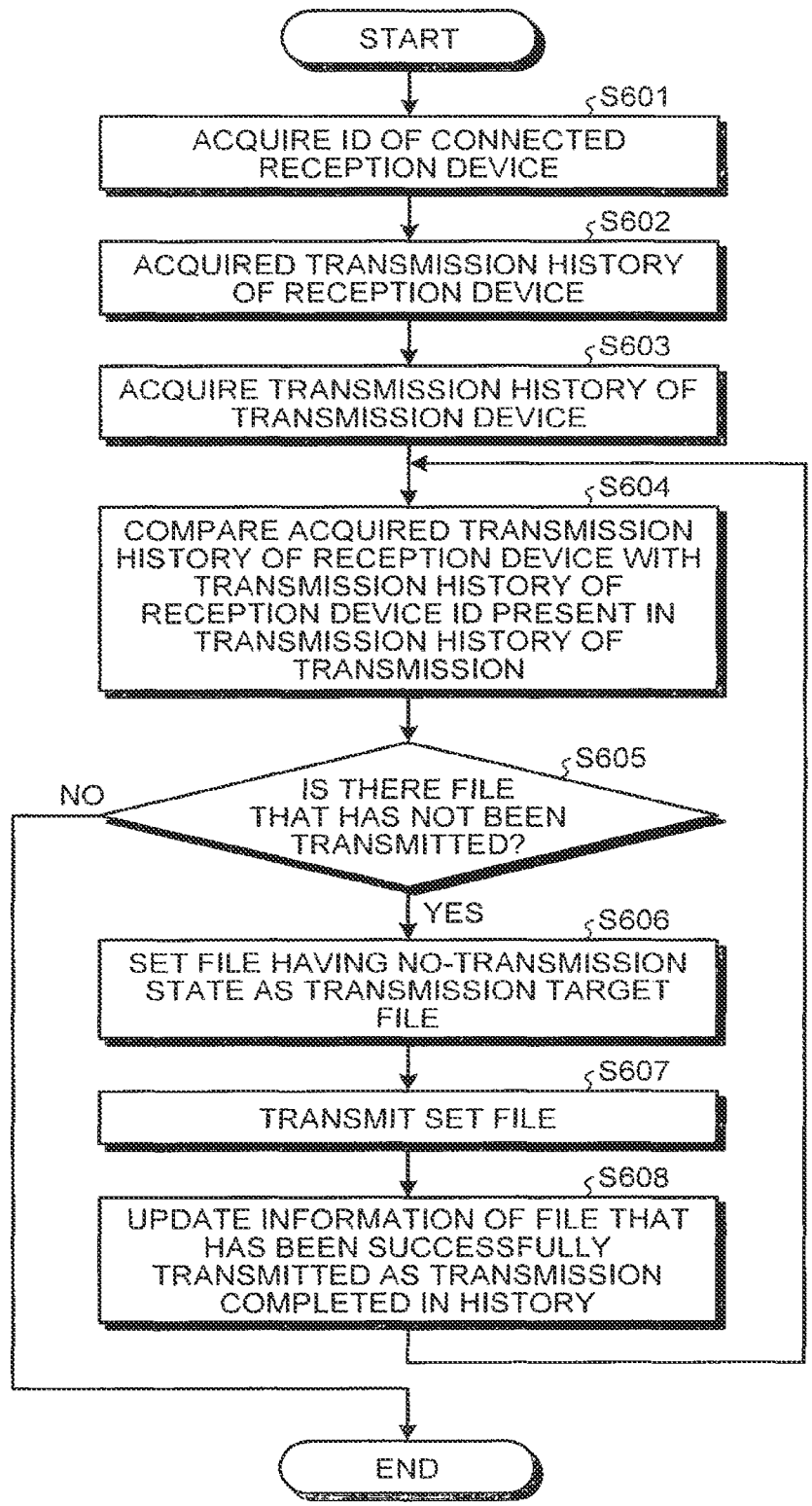
FIG. 26 is a flowchart that illustrates a file transmission process according to the sixth embodiment.

Subsequently, an operation of file transmission that is performed by the communication device 1b will be described. Here, by using the transmission device and the reception device illustrated in FIG. 20 described first, a method of making a selection on the transmission side will be described. FIG. 26 is a flowchart that illustrates a file transmission process according to this embodiment. More specifically, a case will be described in which a file is transmitted/received between the transmission device and the reception device, and, thereafter, a file is added to the transmission device by performing photographing using a digital camera or the like.

First, in the transmission device, the transmission history comparing unit 32 acquires an ID of a connected reception device (Step S601) and acquires a transmission history of the reception device (Step S602). Such information is included in a data frame transmitted from the reception device to the transmission device when the transmission device and the reception device are connected. In addition, among transmission histories acquired from the reception device, the transmission device may be configured to acquire not all the transmission histories but only a history relating to the reception from the transmission device in the reception device.

In the transmission device, the transmission history comparing unit 32 acquires transmission histories of the transmission device from the transmission history storing unit 31 (Step S603). In addition, the transmission history comparing unit 32 may be configured to acquire not all the histories but a transmission history relating to the transmission from the transmission device corresponding to the reception device as the transmission history.

In the transmission device, the transmission history comparing unit 32 compares the acquired transmission history of the reception device with a transmission history corresponding to the reception device (reception device ID) that is included in the transmission histories of the transmission device (Step S604).

Since there is a file that has not been transmitted (Yes in Step S605), the transmission history comparing unit 32 sets a file having the no-transmission status in the transmission list table 16 as a transmission target file. Since there are files 7 to 10 as target files that have not been transmitted, the transmission history comparing unit 32 sequentially sets the files starting from the file 7 in the transmission list table 16 (Step S606).

Then, the communication control unit 14 transmits a file having the no-transmission status that has been set in the transmission list table 16 to the reception device (Step S607).

In the transmission device, the transmission history storage processing unit 30, for a file that has been successfully transmitted to the reception device, updates the status field of the corresponding transmission history list stored in the transmission history storing unit 31 as transmission-completed (Step S608).

In the transmission device, the process is returned to Step S604, and, in a case where there is a file that has not been transmitted, the process of Steps S604 to S608 is repeatedly performed. The transmission device sequentially transmits files starting from the file 7 and repeatedly performs the process until the file 10 is transmitted. When the transmission of the file 10 is completed, since there is no file that has not been transmitted (No in Step S605), the transmission history comparing unit 32 ends the transmission process of the files.

In the transmission device, when a plurality of files are continuously transmitted, and the transmission history list is updated in the end by the transmission history storage processing unit 30, in a case where the transmission is interrupted due to power-off of the device or the like in the middle of the transmission, correct information does not remain in the transmission history list. Accordingly, the transmission history storage processing unit 30, as described above, updates the transmission history list every time when one file is successfully transmitted.

In addition, also in the reception device, after the reception of a file, the status filed of the corresponding transmission history list stored in the transmission history storing unit 31 is updated as reception-completed (Step S608).

Figures 27, 28:
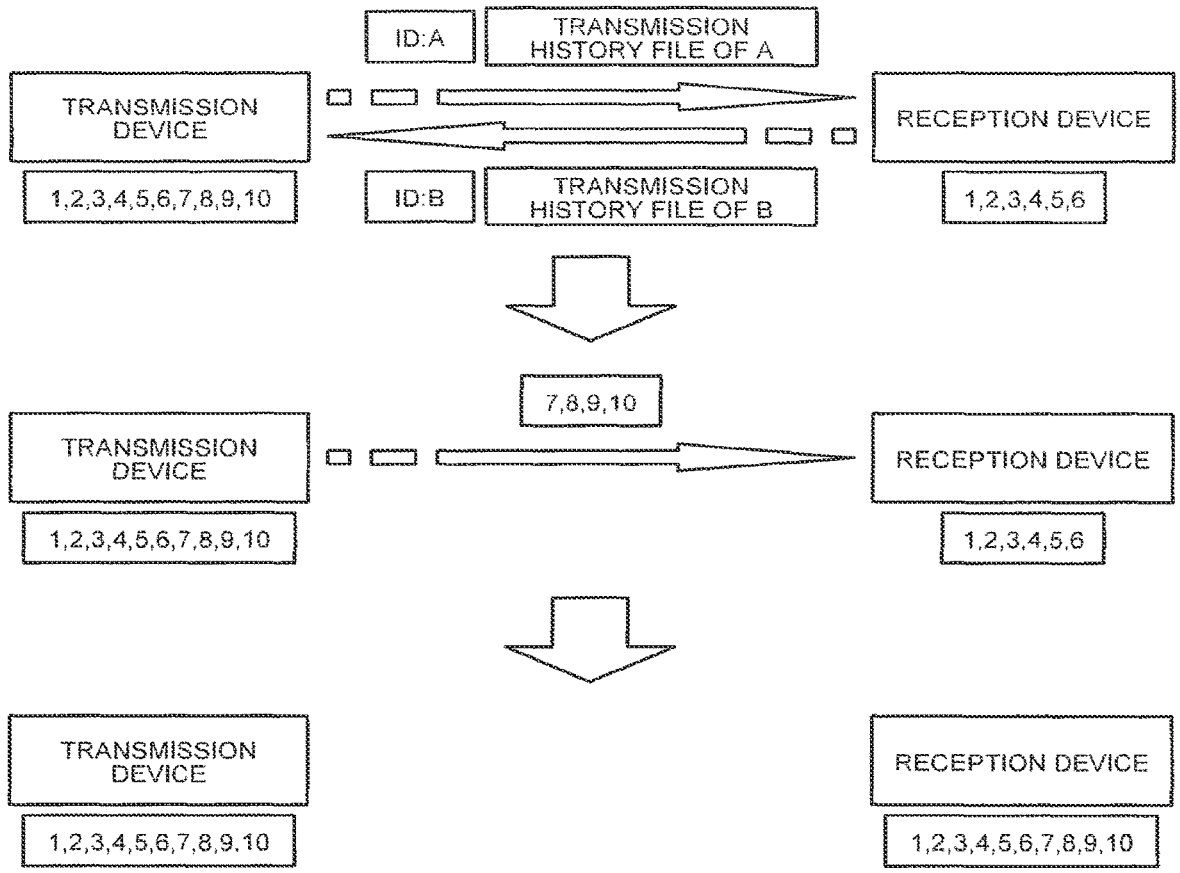
FIG. 27 is a diagram that illustrates information that is transmitted and received between a transmission device and a reception device.
FIG. 28 is a diagram that illustrates an example of the configuration of a transmission history list of a low level.

FIG. 27 is a diagram that illustrates information that is transmitted and received between a transmission device and a reception device. The transmission device and the reception device transmit information of IDs thereof and transmission history lists of the devices to each other. The transmission device compares the transmission history lists thereof with each other and transmits only files 7 to 10 of a difference. Then, each of the transmission device and the reception device includes files 1 to 10, and, by updating each of the transmission history lists thereof, there is no difference therebetween.

The method of making a selection on the transmission side has been specifically described, and an operation of making a selection on the reception side will be simply described. As can be acquired by referring to the flowchart illustrated in FIG. 26, the reception device performs processes that correspond to Steps S601 to S605. The reception device selects files that have not been transmitted in the process corresponding to Step S606 and requests files desired to be received from the transmission device. The transmission device transmits transmission files in Step S607. Then, in Step S608, the reception device and the transmission device update status fields of the transmission history lists stored in the transmission history storing units 31 thereof. Also in this case, the reception device and the transmission device can form the states similar to those according to the method of making a selection on the transmission side.

As described in the first embodiment and the like, in the near field communication, as a trigger for transmission, a user's button operation or the like is not necessary, and, when there is a file that is a transmission target, the start time of a connection with the partner device is triggered.

In addition, in each device (for example, a digital camera), there are cases where a file is newly added from a PC or the like through a file copying process in addition to the transmission process from other devices described above. Accordingly, each device updates the transmission history list before the start of a transmission process for the other devices and adds a newly added file. At this time, the status of the newly added file is no transmission.

Furthermore, in a case where a file is newly added from a PC or the like through a file copying process, a case may be considered in which an old file of the past is added. Also in such a case, since the old file of the past has not been transmitted to the partner device, the status is no transmission. Accordingly, the transmission history comparing unit 32 also can set an old file of the past in the transmission list table 16 as a transmission target file as a file having the no-transmission status.

According to the sixth embodiment, in the communication device 1*b* that is a file transmission/reception device, the transmission device side and the reception device side transmit/receive information of the transmission histories thereof to/from each other, and the transmission device transmits only files that have not been transmitted to the reception device. Alternatively, the reception device requests the transmission device to transmit files that have not been received, and the transmission device transmits the requested files. As a result, a situation can be avoided in which the same file is duplicately transmitted several times, and an advantage of improving the communication efficiency by shortening the time required for file transmission can be acquired.

Seventh Embodiment

In the sixth embodiment, as the transmission history list stored in the transmission history storing unit 31, as illustrated in FIGS. 24 and 25, the status is managed for each file for each partner device. However, in a case where the number of target files or target partner devices is increased, the capacity of the transmission history storing unit 31 is increased. In addition, the transmission history comparing unit 32 also needs a high processing capability for file searching or the like. In a device using the transmission history list, the speed for searching the transmission history list depends on the processing capability of the hardware configuration of a central processing unit (CPU) and the like that are mounted therein.

Accordingly, a plurality of management levels of the transmission history list are prepared. The transmission history list described in the sixth embodiment is set to have a high level, and, in this embodiment, a case will be described in which a transmission history list having a low management level lower than that of the transmission history list described in the sixth embodiment is used.

The transmission history list of the high level is a case where the amount of managed information is large, and all the transmission histories of the past are formed and stored as a list as file information (a file name, update date and time, a file size, a packet, and a status) of all the transmitted files, whereby a large amount of data is formed for each file transmission (see FIGS. 24 and 25). FIG. 28 is a diagram that illustrates an example of the configuration of a transmission history list of a low level. The transmission history list of the low level is a case where the amount of managed information is small, and, for example, only the information of a file transmitted last is formed as a list as a transmission history and is stored in the transmission history storing unit 31, whereby a large amount of data is not formed. Accordingly, the management level can be properly used depending on the processing capability of a device. A method of writing each item (a partner device ID, update date and time, or the like) of the transmission history list of the low level is similar to that of the transmission history list of the sixth embodiment (the high level).

Figure 29:
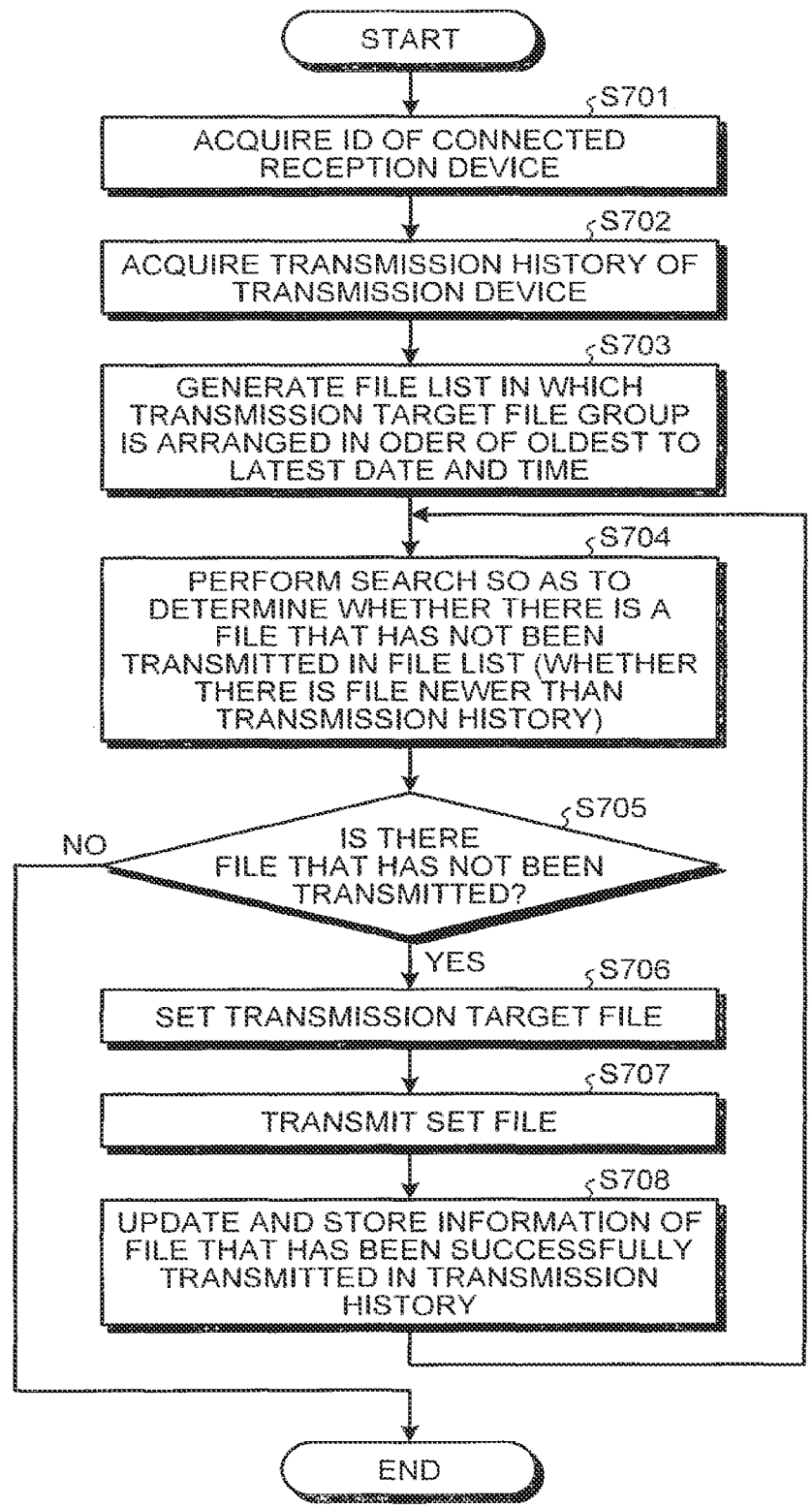
FIG. 29 is a flowchart that illustrates a file transmission process according to a seventh embodiment.

Subsequently, an operation of transmitting a file that is performed by the communication device 1*b* of a case where the transmission history list of the low level is used will be described. Here, the description will be presented using the transmission device illustrated in FIG. 20 that has been described first. FIG. 29 is a flowchart that illustrates a file transmission process according to this embodiment.

First, in the transmission device, the transmission history comparing unit 32 acquires an ID of a connected reception device (Step S701). The information of the ID is included in a data frame transmitted from the reception device to the transmission device when the transmission device and the reception device are connected together.

In the transmission device, the transmission history comparing unit 32 acquires the transmission history of the device to which it belongs from the transmission history storing unit 31 (Step S702). Here, the transmission history comparing unit 32 may be configured to acquire only transmission histories relating to the transmission of the device, to which it belongs, corresponding to the reception device as the transmission histories instead of all the transmission histories.

In the transmission device, the transmission history comparing unit 32 arranges a group of files that are transmission targets in order of oldest date to newest data, thereby generating a file list (Step S703).

In the transmission device, the transmission history comparing unit 32 searches for a file that has not been transmitted from the file list (Step S704). More specifically, the transmission history comparing unit 32 searches for a file that is the same as the file that has been successfully transmitted last to a corresponding transmission device in the transmission history from the file list in which files are listed in order of oldest date to newest date. In a case where the same file is present, a next file of the same file and subsequent files are new files, in other words, files that have not been transmitted.

Figure 30:
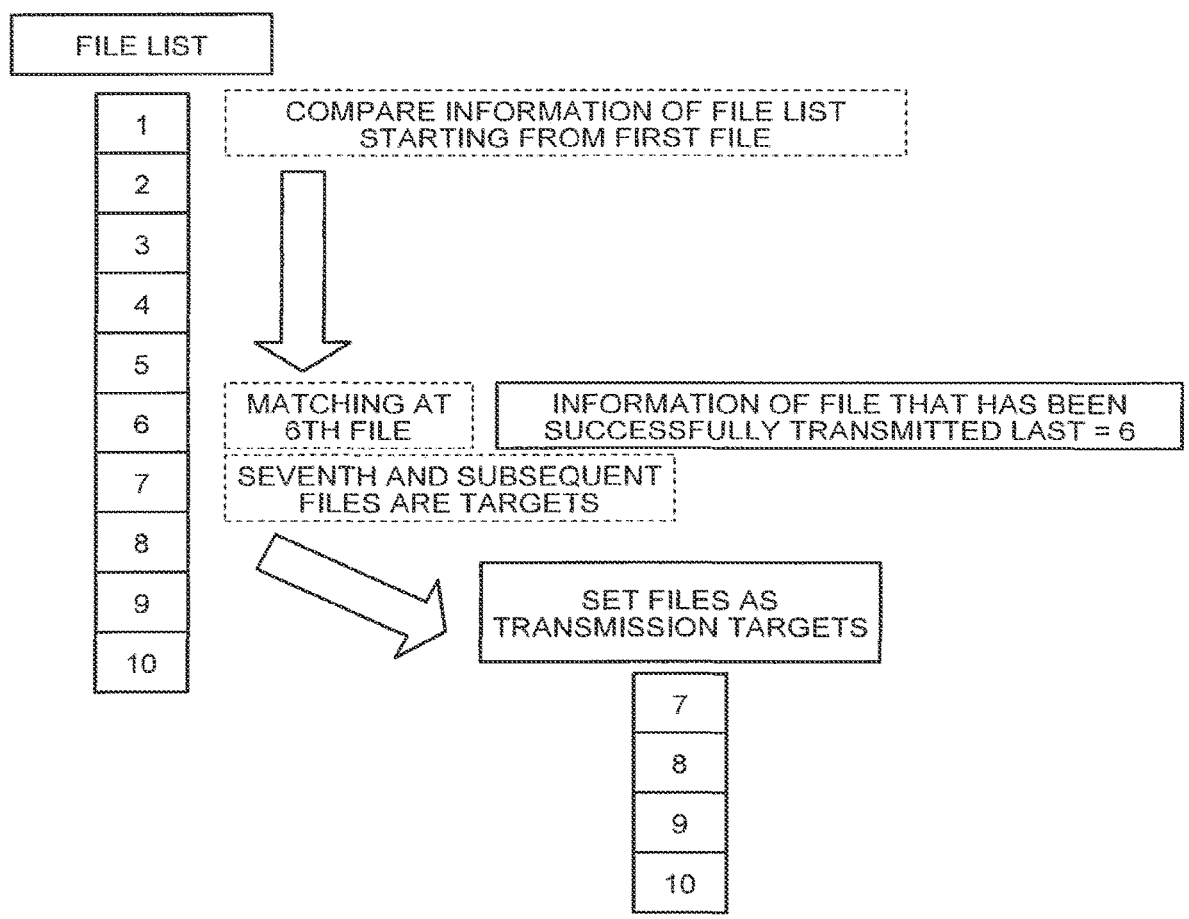
FIG. 30 is a diagram that illustrates a process of searching for files that have not been transmitted.

FIG. 30 is a diagram that illustrates a process of searching for files that have not been transmitted. In a file list, there are files 1 to 10 that are arranged in order of oldest date to newest date. The transmission history comparing unit 32 compares the file, which has been successfully transmitted last written in the transmission history with information of the file list in order from the file 1.

More specifically, the transmission history comparing unit 32 performs a search for determining whether or not the same file as the file that has been successfully transmitted last, which is written in the transmission history, is present in the file list. Since the transmission device transmits files up to the file 6 at the time of the first transmission, here, matching occurs at the file 6. Accordingly, the transmission history comparing unit 32 determines that the file 7 and subsequent files (files 7 to 10) are files that have not been transmitted (Yes in Step S705). On the other hand, in a case where there is no matching file, since the transmission from the transmission device to this reception device is new transmission, all the files have not been transmitted, and thus, all the files are set as the transmission targets.

Since there are files that have not been transmitted (Yes in Step S705), the transmission history comparing unit 32 sets the files that have not been transmitted in the transmission list table 16 as transmission target files. Since there are the files 7 to 10 as the target files that have not been transmitted, the transmission history comparing unit 32 sequentially sets files starting from the file 7 in the transmission list table 16 (Step S706).

Then, the communication control unit 14 transmits a file, which is set in the transmission list table 16, having the no-transmission status to the reception device (Step S707).

In the transmission device, the transmission history storage processing unit 30 updates, for the reception device to which the file has been successfully transmitted, file names included in the corresponding transmission history list stored in the transmission history storing unit 31 and items such as update date and time and the like for the file (Step S708).

Similar to the sixth embodiment, in a case where a plurality of files are continuously transmitted, the transmission history storage processing unit 30 repeatedly performs the process of Steps S704 to S708. The transmission device sequentially transmits the files in order from the file 7 and repeats the process until the file 10 is transmitted. When the transmission of the file 10 is completed, there is no file that has not been transmitted (No in Step S705), and accordingly, the transmission history comparing unit 32 ends the file transmission process. The transmission device updates the transmission history list every time when one file has been successfully transmitted.

According to the seventh embodiment, the communication device 1b that is a file transmission/reception device stores only information of a file that has been transmitted or received last as the transmission history. As a result, compared to the sixth embodiment, the capacity of the transmission history storing unit 31 may be configured to be small, and the processing capability of the transmission history comparing unit 32 may be configured to be low, whereby an advantage of realizing the device at low cost can be acquired.

Eighth Embodiment

In this embodiment, in a method of updating the transmission history list of the low level, operations performed in various statuses in which update is necessary will be described.

First, in a case where the transmission history list of the low level is used, a case will be described in which all files have been transmitted at the time of first transmission, thereafter, a file is added, and transmission of the second time is performed.

Figure 31:
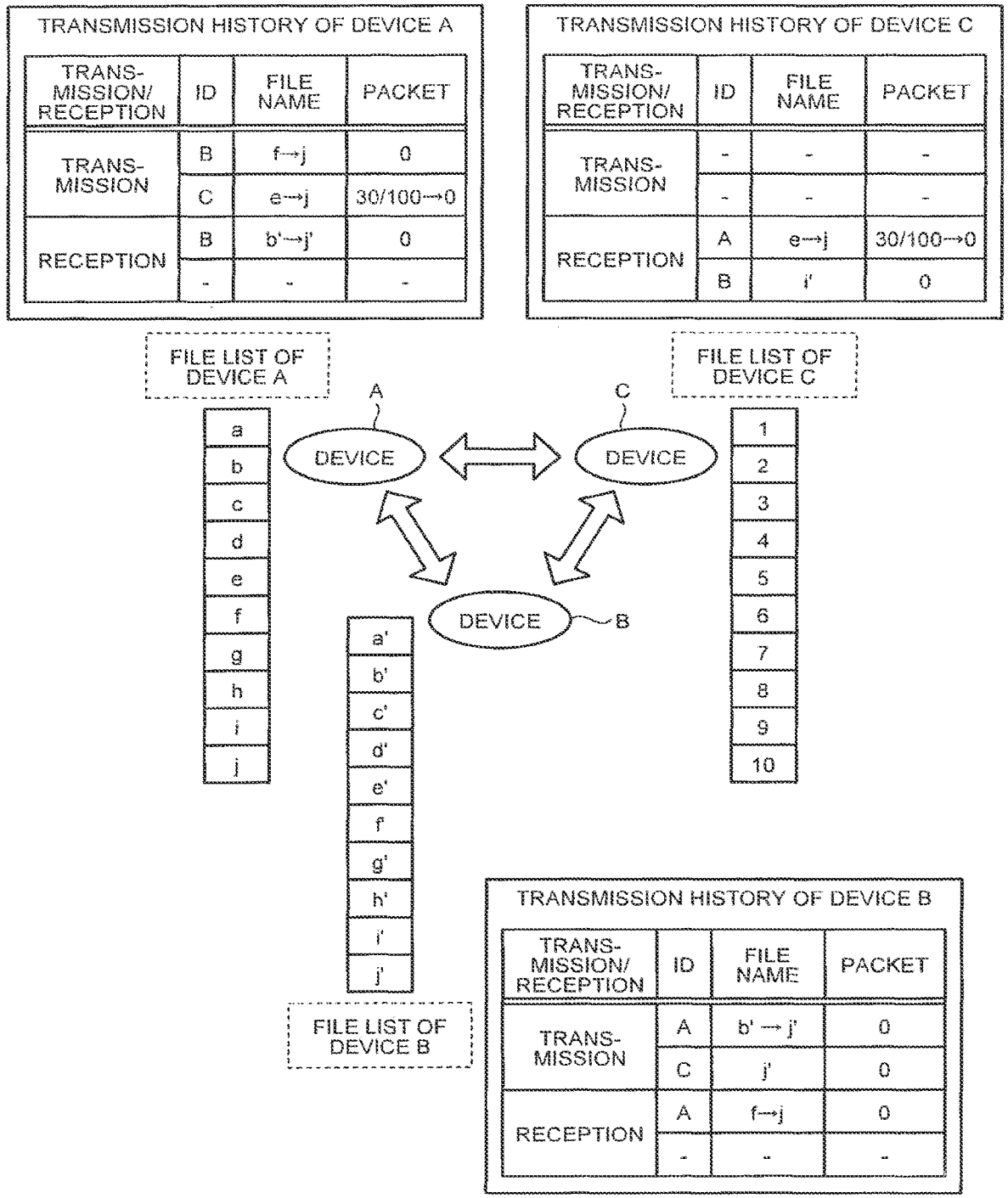
FIG. 31 is a diagram that illustrates transitions of a file list and a transmission history list of each device.

FIG. 31 is a diagram that illustrates transitions of a file list and a transmission history list of each device. The configuration of each device is similar to that of the sixth embodiment (see FIGS. 21 and 22). While devices A, B, and C illustrated in FIG. 31 can transmit and receive files, here, the device A is assumed to be a transmission device, and the device B is assumed to be a reception device. In addition, for the transmission history of each device, items necessary for description of this embodiment are extracted.

In the device A, the transmission history comparing unit 32 is connected to the device B and acquires a partner device ID at the time of the first transmission. In the device A, since a device of which the "partner device ID" corresponds to the device B is not present in the category of the transmission of the transmission history list, the transmission history comparing unit 32 performs control so as to transmit all the files (a) to (f) included in the file list at that time point.

In the device A, since all the files (a) to (f) have been successfully transmitted to the device B, the transmission history storage processing unit 30 stores information of the ID (B) of the device B and the file (f) that has been successfully transmitted last in the transmission category of the transmission history list stored in the transmission history storing unit 31. At this time, since a file that has been interrupted in the middle of the transmission process is not present, in the field of the packet that represents a successfully-received packet, a transmission result of "0" is stored.

In the device B, since the files (a) to (f) have been received from the device A, the transmission history storage processing unit 30 stores information of the ID (A) of the device A and the file (f) that has been successfully transmitted last in the reception category of the transmission history list stored in the transmission history storing unit 31. At this time, since a file that has been interrupted in the middle of the transmission process is not present, a reception result of "0" is stored in the field of the packet.

Thereafter, four files (g) to (j) are assumed to be newly added to the device A. In the device A, in the second connection with the device B, "ID=B" is present in the transmission history list, and information of the file (f) is present as the information of the successfully-transmitted file, and accordingly, the transmission is performed starting from the next file (g). In the device A, when the transmission is completed up to the file (j), in the transmission history lists of the device A and the device B, information of the file (j) is stored as the information of the successfully-transmitted file.

Subsequently, in a case where the transmission history list of the low level is used, a case will be described in which transmission is interrupted due to a connection cut-off between devices in the middle of the transmission of the previous file at the time of the first transmission, and thereafter, retransmission is performed. In the case illustrated in FIG. 31, the device B is assumed to be a transmission device, and the device A is assumed to be a reception device.

In the device B, the transmission history comparing unit 32 is connected to the device A and acquires a partner device ID at the first transmission process. In the device B, since a device of which the "partner device ID" corresponds to the device A is not present in the category of the transmission of the transmission history list, the transmission history comparing unit 32 performs control so as to transmit all the files (a') to (j') included in the file list at that time point.

While the device B attempts to transmit all the files (a') to (j') to the device A, the transmission has been interrupted immediately after successful transmission of a file (b'). Accordingly, the transmission history storage processing unit 30 stores information of the ID (A) of the device A and the file (b') that has been successfully transmitted last in the transmission category of the transmission history list stored in the transmission history storing unit 31. At this time, since a file that has been interrupted in the middle of the transmission process is not present, a transmission result of "0" is stored in the field of the packet.

In the device A, since the files (a') and (b') have been received from the device B, the transmission history storage processing unit 30 stores information of the ID (B) of the device B and the file (b') that has been successfully transmitted last in the reception category of the transmission history list stored in the transmission history storing unit 31. At this time, since a file that has been interrupted in the middle of the transmission process is not present, a reception result of "0" is stored in the field of the packet.

Thereafter, when being reconnected to the device A, the device B resumes the transmission of files. In the device B, since "ID=A" is present in the transmission history list, and the information of the file (b') is present as the information of the successfully-transmitted file, transmission is performed starting from the next file (c'). When the device B completes the transmission up to the file (j'), in the transmission history lists of the device B and the device A, information of the file (j') is stored as the information of a successfully-transmitted file.

Subsequently, in the case where the transmission history list of the low level is used, a case will be described in which transmission is interrupted due to a connection cut-off between devices in the middle of the transmission of all files at the transmission of the first time, and thereafter, retransmission is performed in units of packets. In the case illustrated in FIG. 31, a device A is assumed to be a transmission device, and a device C is assumed to be a reception device.

In the device A, the transmission history comparing unit 32 is connected to the device C and acquires a partner device ID at the time of the first transmission. In the device A, since a device of which the "partner device ID" corresponds to the device C is not present in the category of the transmission of the transmission history list, the transmission history comparing unit 32 performs control so as to transmit all the files (a) to (j) included in the file list at that time point.

While the device A attempts to transmit all the files (a) to (j) to the device C, the transmission has been interrupted in the middle of the transmission of the file (f). Accordingly, the transmission history storage processing unit 30 stores information of the ID (C) of the device C and the file (e) that has been successfully transmitted last in the transmission category of the transmission history list stored in the transmission history storing unit 31. At this time, since a file that has been interrupted in the middle of the transmission process is present, in the field of the packet, a transmission result of "30/100" (number of successful packets/total number of packets) is stored as a process history. Here, for example, the transmission is performed in the unit of one packet of 64 kB.

In the device C, since the files (a) to (e) have been received from the device A, the transmission history storage processing unit 30 stores information of the ID (A) of the device A and the file (e) that has been successfully transmitted last in the reception category of the transmission history list stored in the transmission history storing unit 31. At this time, since a file that has been interrupted in the middle of the transmission process is present, a transmission result of "30/100" is stored in the field of the packet as a process history.

Thereafter, when being reconnected to the device C, the device A resumes the transmission of files. In the device A, since "ID=C" is present in the transmission history list, the information of the file (e) is present as the information of the successfully-transmitted file, and the information of "30/100" is present in the field of the packet as the process history, transmission is performed starting from the 31st packet of the next file (f). When the device A completes the transmission up to the file (j), in the transmission history lists of the device A and the device C, information of the file (j) is stored as the information of a successfully-transmitted file.

Figure 32:
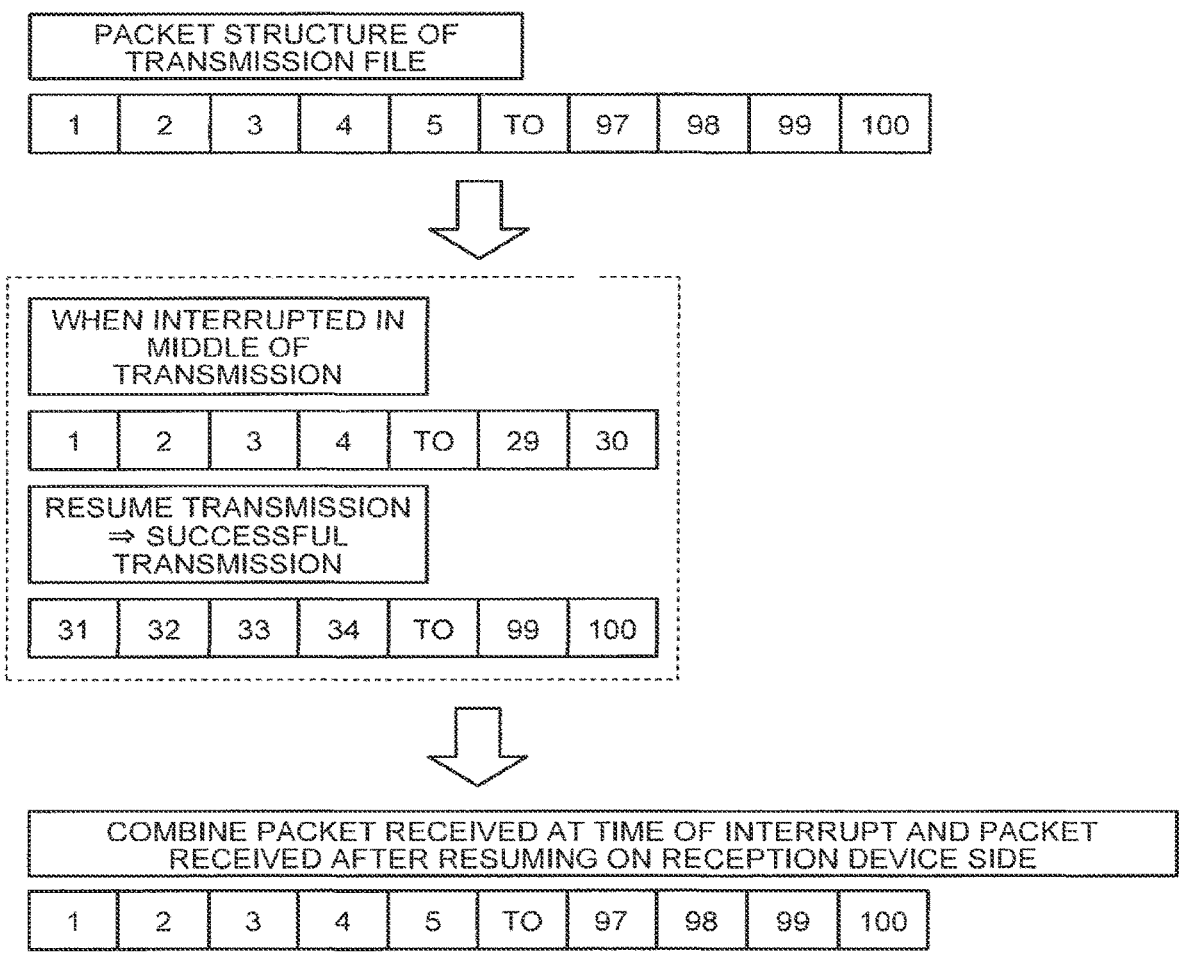
FIG. 32 is a diagram that illustrates an example of the configuration of a file (j) that is interrupted in the middle of a transmission process.

FIG. 32 is a diagram that illustrates an example of the configuration of the file (j) that has been interrupted in the middle of the transmission process. When the size of the file (f) is assumed to be 100 packets, since packets 1 to 30 have been successfully transmitted until the interrupt time point, the device A starts transmission starting from a packet 31 after resuming the transmission process and transmits packets 31 to 100.

In the device C, more specifically, the difference transmission control unit 18 stores the packets 1 to 30 that have been successfully received until the middle of interruption in the packet storing unit 33, and the restoration processing unit 34 restores the packet (f) by combining the packets 1 to 30 stored in the packet storing unit 33 and packets 31 to 100 after the resuming of the transmission process together.

Subsequently, in the device of the transmission device or the reception device, when the power is turned off before the completion of the update of the transmission history of the file transmission, the transmission histories do not match each other on the transmission device side and the reception device side. Here, a recovery method for matching the transmission histories by updating the transmission history of one side in a case where the transmission histories of the transmission device and the reception device do not match each other will be described. In the case illustrated in FIG. 31, the device B is assumed to be a transmission device, and the device C is assumed to be a reception device.

In the device B, the transmission history comparing unit 32 is connected to the device C and acquires a partner device ID at the time of the first transmission. In the device B, since a device of which the "partner device ID" corresponds to the device C is not present in the category of the transmission of the transmission history list, the transmission history comparing unit 32 performs control so as to transmit all the files (a') to (j') included in the file list at that time point. At this time, in the device B, the transmission history storage processing unit 30 updates the information of successfully-transmitted files in the transmission history file stored in the transmission history storing unit 31 every time when a file is transmitted one by one.

In the device C, when the files (a') to (j') are received from the device B, the transmission history storage processing unit 30 stores information of the ID (B) of the device B and the file that has been successfully transmitted last in the reception category of the transmission history list stored in the transmission history storing unit 31. At this time, in the device C, every time when the transmission history storage processing unit 30 receives a file one by one, the information of files that have been successfully received is updated in the transmission history file stored in the transmission history storing unit 31.

When the device B successfully transmits the last file (j'), in the transmission history list, the transmission of the file (j') is recorded as the history of the device C. Here, on the device C side, after the last file (j') is received, the power of the device is assumed to be turned off during the update (before completion) of the transmission history file. In such a case, in the device C, in the transmission history list, not the last file (j') but the previous file (i') is recorded in a reception record from the device B. Accordingly, in the devices B and C, the transmission histories thereof do not match each other.

In such a case, the devices B and C recognize that the transmission histories thereof do not match each when the devices are connected again and exchange the transmission histories thereof. The device C performs a search for determining whether or not the file (j') is present based on the information of the transmission history that is acquired from the device B. In a case where a corresponding file has been found, the device C regards that the file (j') has already been received and updates the last-received-file included in the transmission history from the file (i') to the file (j'). In this way, the transmission histories on both sides match each other.

According to the eighth embodiment, in the communication device 1b that is a file transmission/reception device, in a case where the transmission history of the low level is used, an item for the opposing device is added to the transmission history list at the time of transmitting/receiving a file for the first time. However, thereafter, when a file is transmitted/received to/from the opposing device that has already transmitted or received the file for the second time or subsequent times, the amount of information stored in the transmission history list for the transmission/reception of the file is not increased, but the transmission/reception can be responded by updating only the histories of the communication device and the opposing device. As a result, in a case where the transmission history of the low level is used, since detailed information of a file that is newly transmitted and received does not need to be stored, an advantage of performing updating through a simple process can be acquired in a case where an interrupt occurs in the middle of the transmission process or even in a case where an irregular situation such as a situation, in which the transmission histories of the communication device side and the partner side do not match each other, occurs.

Ninth Embodiment

In the sixth to eighth embodiments, while the communication device 1b, which is illustrated in FIG. 21, corresponding to the first to third embodiments has been described, the method of using the transmission history may be also used for the communication device of the removable device described in the fourth and fifth embodiments.

Figure 33:
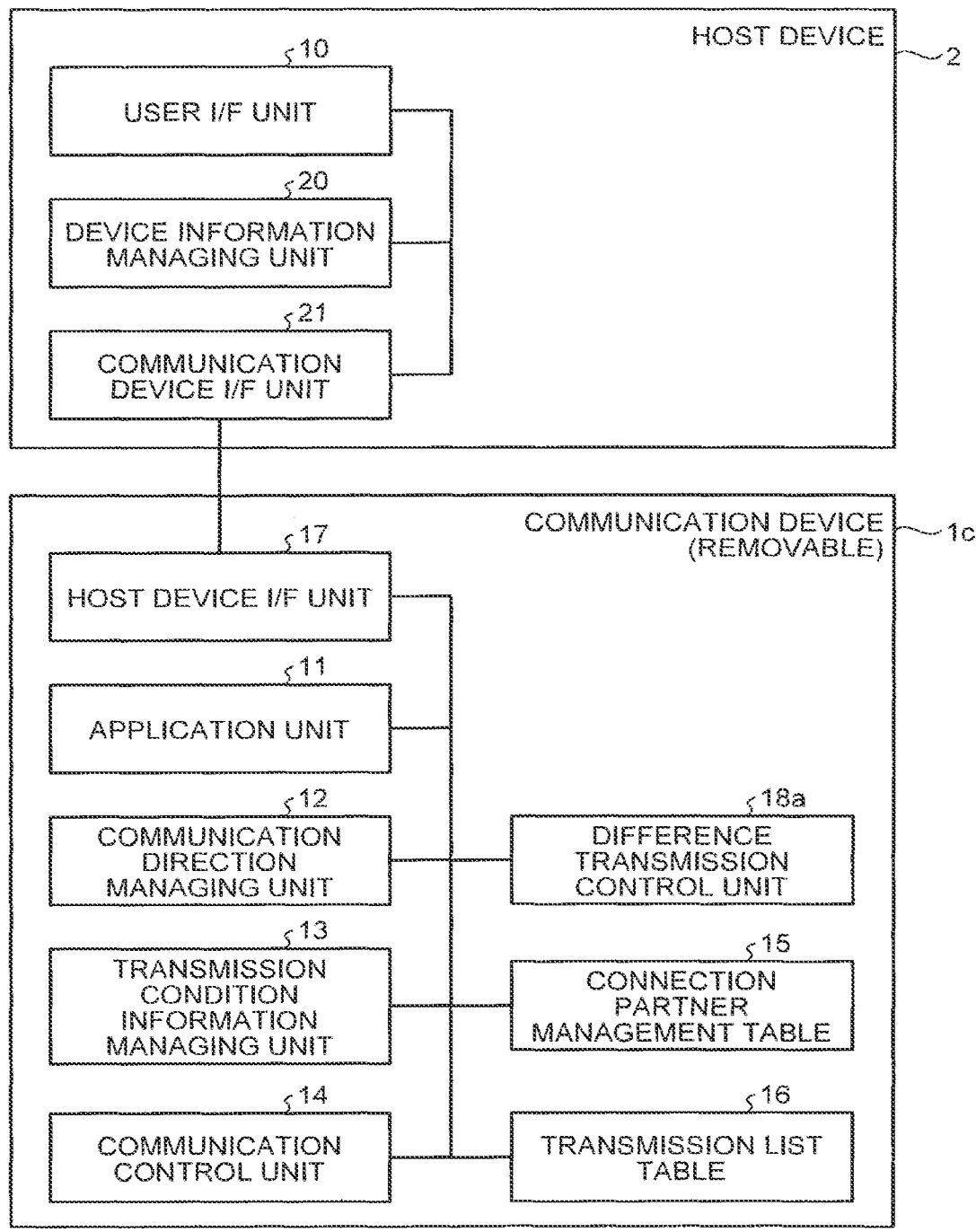
FIG. 33 is a diagram that illustrates an example of the configuration of a communication device and a host device according to a ninth embodiment.

FIG. 33 is a diagram that illustrates an example of the configuration of a communication device 1c and a host device 2 according to this embodiment. The communication device 1c includes: an application unit 11; a communication direction managing unit 12; a transmission condition information managing unit 13; a communication control unit 14; a connection partner management table 15; a transmission list table 16; a host device I/F unit 17; and a difference transmission control unit 18a.

Figure 34:
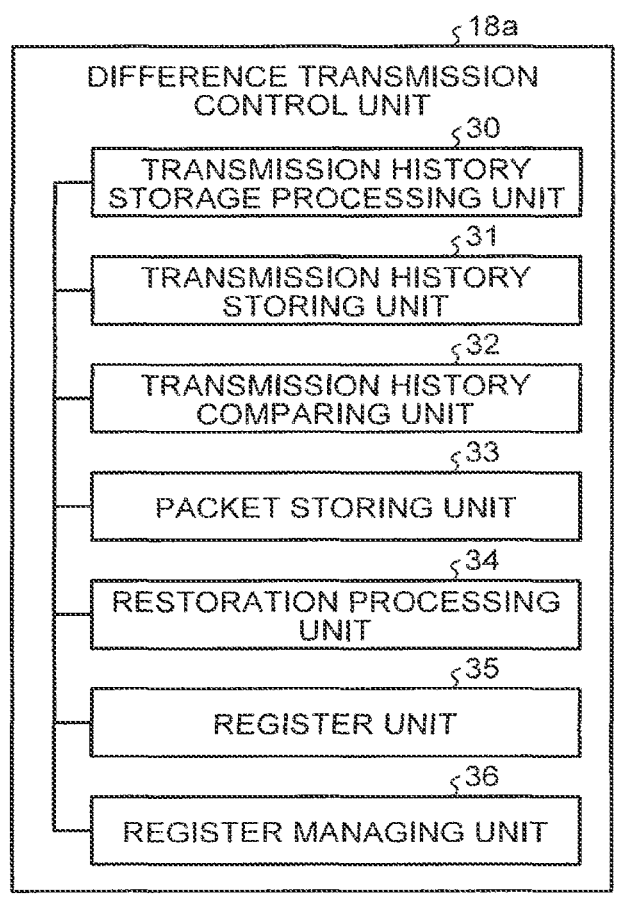
FIG. 34 is a diagram that illustrates an example of the configuration of a difference transmission control unit according to the ninth embodiment.

FIG. 34 is a diagram that illustrates an example of the configuration of the difference transmission control unit 18a according to this embodiment. The difference transmission control unit 18a includes: a transmission history storage processing unit 30; a transmission history storing unit 31; a transmission history comparing unit 32; a packet storing unit 33; a restoration processing unit 34; a register unit 35; and a register managing unit 36. The register unit 35 is a register that can be used by both the communication device 1c and the host device 2. The register managing unit 36 performs a process of reading/writing data from/into the register unit 35.

Figure 35:
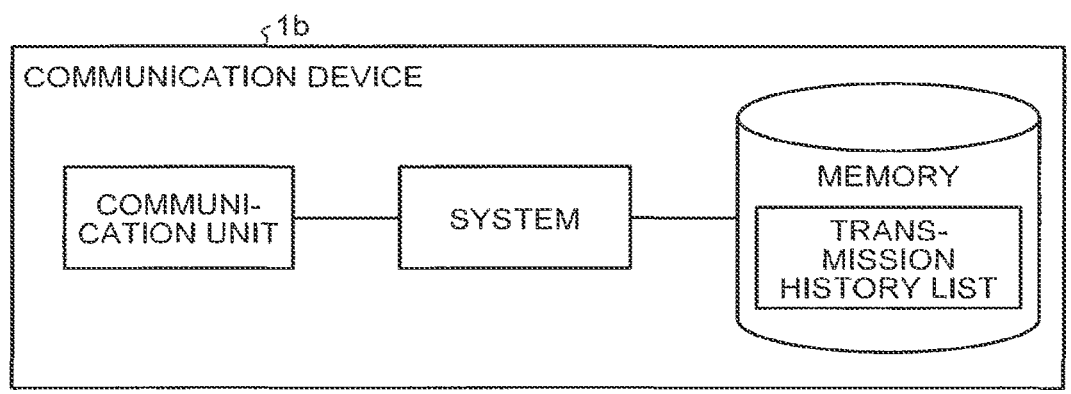
FIG. 35 is a simplified diagram of the configuration of a communication device.

FIG. 35 is a simplified diagram of the configuration of the communication device 1b. For easy comparison with FIGS. 36 and 37 to be described later, FIG. 35 illustrates the configuration illustrated in FIG. 21 as a communication unit, a memory in which transmission history lists are stored, and the other configuration as a system. In FIG. 35, the communication unit corresponds to the communication direction managing unit 12 to the transmission list table 16 illustrated in FIG. 21, the memory corresponds to the transmission history storing unit 31, and the system corresponds to the user I/F unit 10, the application unit 11, the transmission history storage processing unit 30, and the transmission history comparing unit 32 to the restoration processing unit 34. In the configuration illustrated in FIG. 35, the file transmission/reception devices are configured as one device, and the device serves as a host device.

Figure 36:
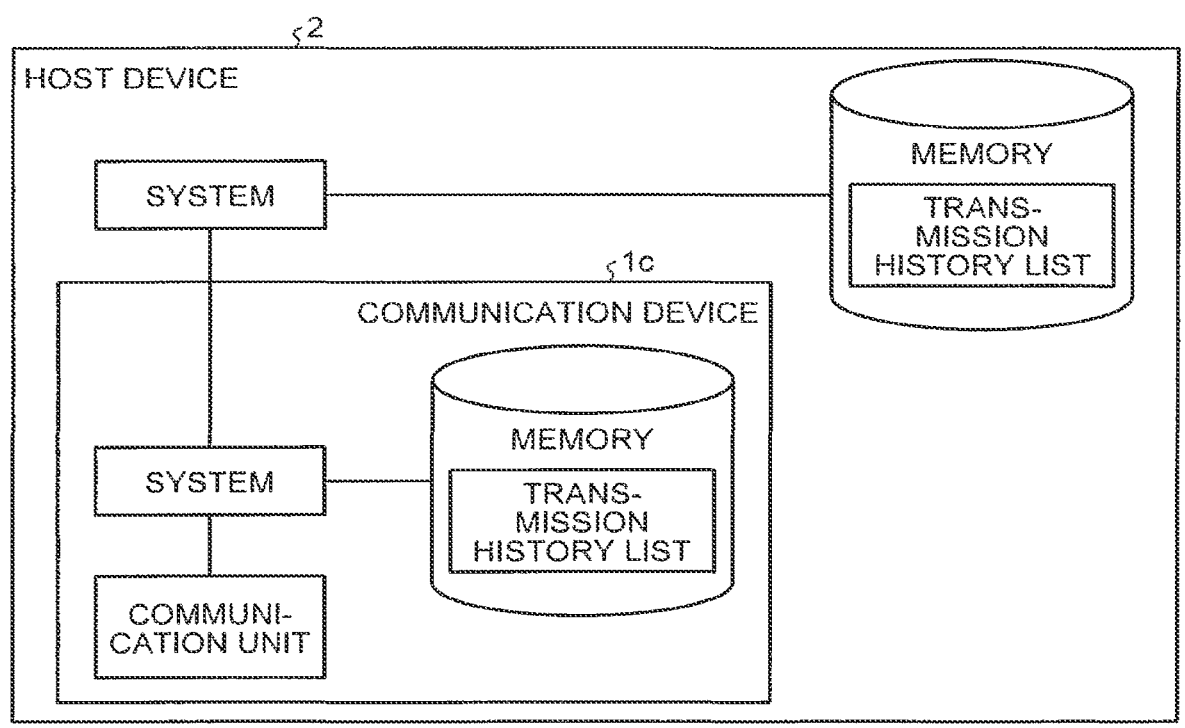
FIG. 36 is a simplified diagram of the configuration of a communication device and a host device.
Figure 37:
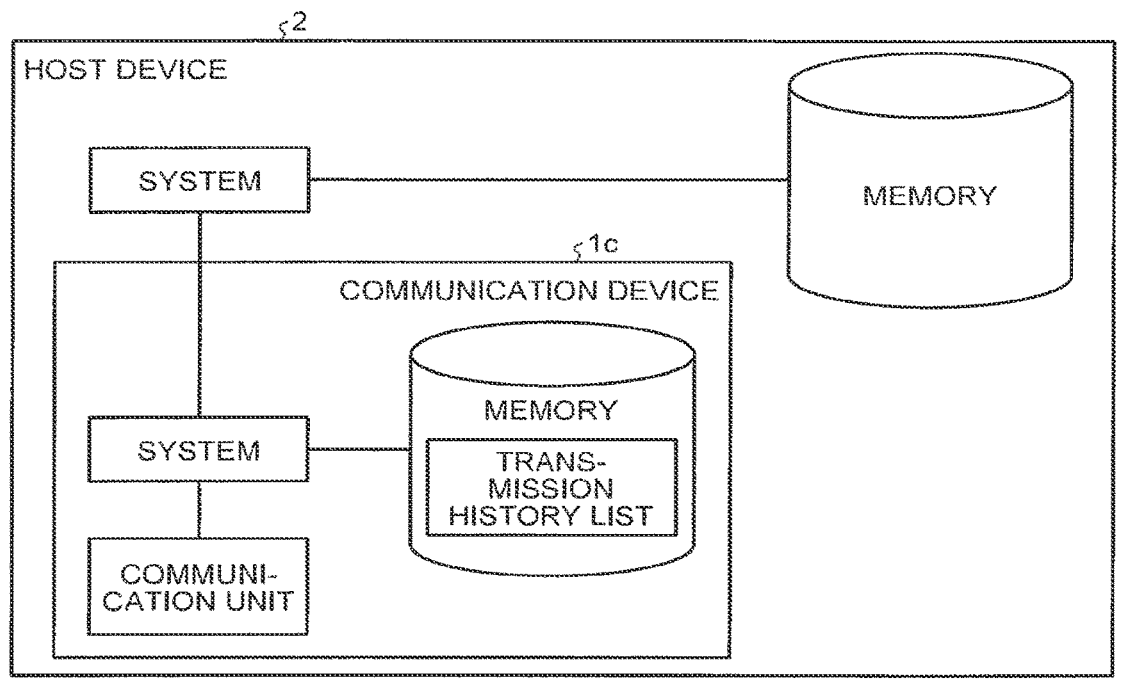
FIG. 37 is a simplified diagram of the configuration of a communication device and a host device.

FIGS. 36 and 37 are simplified diagrams of the configurations of the communication device 1c and the host device 2. FIGS. 36 and 37 are simplified diagrams of the configuration of the communication device 1c and the host device 2 illustrated in FIG. 33. In the configuration illustrated in FIG. 36, a communication unit corresponds to the communication direction managing unit 12 to the transmission list table 16 illustrated in FIG. 33, a memory of the host device 2 corresponds to the transmission history storing unit 31, a memory of the communication device 1c side corresponds to the transmission history storing unit 31, a system of the host device 2 corresponds to the user I/F unit 10, the device information managing unit 20, and the communication device I/F unit 21 illustrated in FIG. 33, and a system of the communication device 1c side corresponds to the application unit 11, the host device I/F unit 17, the transmission history storage processing unit 30, and the transmission history comparing unit 32 to the register managing unit 36.

In the configuration illustrated in FIG. 37, there is a difference in that the transmission history storing unit 31 is not included in the memory of the host device 2. In other words, FIG. 36 illustrates a case where the transmission history list is stored in both the memory disposed on the host device 2 side and the memory of the communication device 1c. In addition, FIG. 37 illustrates a case where the transmission history list is stored only in the memory of the communication device 1c.

As illustrated in FIGS. 35 and 37, in the case where the transmission history list is stored only in the communication device 1b or only in the communication device 1c that is a removable device, there is no difference in the transmission history lists. In contrast to this, as illustrated in FIG. 36, in the case where the transmission history list is stored in both the host device 2 and the communication device 1c, and the communication device 1c is inserted into the host device 2, there is a concern that a difference occurs between two transmission history lists. Accordingly, the communication device 1c and the host device 2 synchronize the transmission history lists through both systems. At this time, in a case where there is a difference between the transmission history lists, the transmission history lists are synchronized to the transmission history list having a higher priority level.

As a method of synchronizing the transmission history lists of the communication device 1c and the host device 2, for example, there is a method in which the transmission history storage processing unit 30 or the transmission history comparing unit 32 of the difference transmission control unit 18a acquires information of the transmission history list of the host device 2 side through the host device I/F unit 17 and the communication device I/F unit 21, compares the acquired transmission history list with the content of the transmission history list stored in the transmission history storing unit 31, and changes the content of the transmission history list stored in the transmission history storing unit 31, or notifies the host device 2 of a change in the content of the transmission history list, but the method is not limited thereto.

According to the ninth embodiment, the communication device 1c that is a removable device and the host device 2 are connected to each other, and, in a case where the information of the transmission history list is stored on both sides, the transmission history lists are synchronized to each other between the communication device 1c and the host device 2. As a result, a difference between the transmission history lists of the communication device 1c and the host device 2 can be eliminated, and, also in a case where a file is transmitted/received to/from any other communication device, similar to the communication device 1b, an advantage of managing files based on the transmission history list can be acquired.

Tenth Embodiment

In this embodiment, similar to the ninth embodiment, in a case where the communication device 1c and the host device 2 are connected to each other, a case will be described in which register information stored inside the communication device 1c is used separately by software of the communication device 1c and software of the host device 2.

Figure 38:
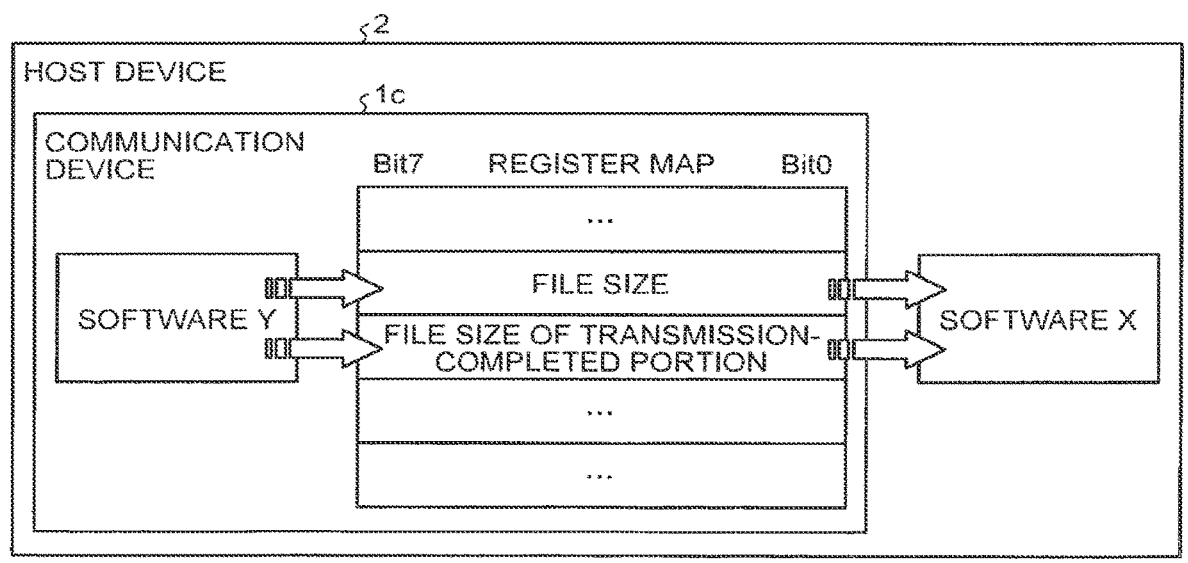
FIG. 38 is a diagram that illustrates register use states of a communication device and a host device.

FIG. 38 is a diagram that illustrates register use states of the communication device 1c and the host device 2. In the host device 2 (for example, a digital camera or the like) and the communication device 1c that is a medium, it is assumed that a register (register unit 35) and software Y using information of the register are arranged in the medium of the communication device 1c, and another software X using the information of the register (register unit 35) is arranged in the host device 2.

In parts of the register (register unit 35), areas for storing file size information of a file that is in the middle of the transmission process and file size information corresponding to a transmitted portion of a file that is in the middle of the transmission are arranged. FIG. 39 is a diagram that illustrates an example of the configuration of a register map. In FIG. 39, parts of "File Size" and "Transferred File Size" correspond to the "file size" and the "file size corresponding to the transmitted portion" of the register map illustrated in FIG. 38.

When a file is transmitted or received, the software Y of the communication device 1c stores the file size information of the file that is in the middle of the transmission process and the file size corresponding to a transmitted portion in the register. Until the transmission/reception is completed, this process is regularly performed several times, and, in a case where the file size is large, the number of times that the process is performed is increased. More specifically, in the difference transmission control unit 18a, the register managing unit 36 updates "File Size" and "Transferred File Size" stored in the register unit 35 (register).

The host device 2 acquires the register information during the transmission/reception process, thereby determining how much portion has been transmitted and received with respect to the file size of the file that is in the middle of the transmission process. The host device 2 can notify the user of the degree of progress of the transmission by performing a GUI display or the like.

In other words, while the software X of the host device 2 side cannot acquire directly the progress status of the file that is in the middle of the transmission of other software (in this case, the software Y arranged inside the communication device 1c), the software X can acquire the progress status of the file that is in the middle of the transmission process from the register information stored in the communication device 1c.

According to the tenth embodiment, the communication device 1c includes a register, and, in a case where both the software of the communication device 1c and the software of the host device 2 use the register, "File Size" and "Transferred File Size" of the register are updated on the communication device 1c side. As a result, on the host device 2 side, by referring to the register information stored in the communication device 1c, the communication device 1c can acquire the progress status of a file that is in the middle of the transmission process, which is acquired as an advantage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A file transmission/reception device comprising:
a processor configured to:
cut off, if a conflict occurs in a connection at a second communication layer higher than a first communication layer with a first device, the connection at the second communication layer with the first device;
decide a mode of the file transmission/reception device when performing a re-connection at the second communication layer via the connection at the first communication layer with the first device as any one mode of a master mode or a slave mode;
switch the file transmission/reception device to the decided mode;
perform transmission, reception, or transmission/reception of a file with the first device and the file transmission/reception device in the decided mode; and
decide the mode as the slave mode when the first device does not have a function for switching between the master mode and the slave mode based on specification infounation of the first device acquired via the connection at the first communication layer from the first device after occurrence of the conflict.

2. The file transmission/reception device according to claim 1, wherein the processor is further configured to:
acquire identification information used for identifying the first device from the first device after the occurrence of the conflict, cut off the connection; and
determine the mode of the file transmissionlreception device at a time of reconnection based on a result of a comparison between the identification information of the first device and identification information of the file transmission/reception device.

3. The file transmission/reception device according to claim 1, wherein the processor is further configured to:
after a cut-off of the connection with the first device, set the mode of the file transmission/reception device at a time of reconnection as the slave mode and, in a case that a connection request is not received from the first device, switch the mode of the file transmission/reception device to the master mode after a predetermined time has elapsed.

4. The file transmission/reception device according to claim 1, wherein the processor is further configured to:
acquire identification information used for identifying the first device from the first device after the occurrence of the conflict and cut off the connection;
acquire the identification information from the first device a second time in a reconnection process; and
generate a notification of connection establishment in a case that the acquired identification infoi cation matches the identification information of the file transmission/reception device.

5. The file transmission/reception device according to claim 1, wherein the processor is further configured to:
after completing a process of one mode of the master mode and the slave mode, perform control of switching to the other mode.

6. The file transmission/reception device according to claim 5, wherein the processor is further configured to:
in a case that the file transmission/reception device is in the master mode, perform control of cutting off the connection with the first device after completing a process of the master mode.

7. The file transmission/reception device according to claim 1, wherein,
in a case that the first device is connected to a plurality of host devices, a transmission condition information is set as identification information used for identifying each of the host devices.

8. The file transmission/reception device according to claim 1, wherein
communication is TransferJet.

9. The file transmission/reception device according to claim 1, wherein the processor is further configured to:
generate a transmission history list including identification information of the first device and information of transmitted files and received files; and
set files that have not been transmitted to the first device as transmission target files based on a result of a comparison between the transmission history list, which is generated by the first device, acquired from the first device and a transmission history list of the file transmission/reception device.

10. The file transmission/reception device according to claim 1, wherein the processor is further configured to:
generate a transmission history list including identification information of the first device and information of transmitted files and received files; and
request the first device to transmit files that have not been received by the file transmission/reception device based on a result of a comparison between a transmission history list, which is generated by the first device, acquired from the first device and the transmission history list of the file transmission/reception device.

11. The file transmission/reception device according to claim 10, further comprising:
a memory,
wherein the processor is further configured to:
store, in the memory, packets configuring a file acquired from the first device through a plurality of times of file reception;
restore the file from the packets stored in the memory; and
record, in the transmission history list, information of packets that have been successfully transmitted or received among the packets configuring the file in the transmission history list.

12. The file transmission/reception device according to claim 10, wherein the processor is further configured to:
after a connection establishment with the first device, acquire the transmission history list, which is generated by the first device, from the first device.

13. The file transmission/reception device according to claim 10, wherein the file transmission/reception device is connectable to a host device and further comprises:
a register that is usable for the host device,
wherein the processor is further configured to store, in the register, information of a file size of a file that is in a middle of transmission or reception and a file size of a file of which transmission or reception has been completed.

* * * * *